US010618668B2

(12) United States Patent
Pruzan et al.

(10) Patent No.: US 10,618,668 B2
(45) Date of Patent: Apr. 14, 2020

(54) SYSTEMS AND APPARATUS FOR CONTROLLING MOVEMENT OF OBJECTS THROUGH A FLUID

(71) Applicant: Analytical Mechanics Associates, Inc., Hampton, VA (US)

(72) Inventors: Daniel Allan Pruzan, Redwood City, CA (US); Daniel Joseph Lesieutre, San Jose, CA (US); Simon M. Bourne, Norco, CA (US)

(73) Assignee: ANALYTICAL MECHANICS ASSOCIATES, INC., Hampton, VA (US)

( * ) Notice: Subject to any disclaimer, the term of this patent is extended or adjusted under 35 U.S.C. 154(b) by 431 days.

(21) Appl. No.: 15/461,706

(22) Filed: Mar. 17, 2017

(65) Prior Publication Data

US 2018/0065757 A1 Mar. 8, 2018

Related U.S. Application Data

(60) Provisional application No. 62/384,138, filed on Sep. 6, 2016.

(51) Int. Cl.
*B64D 39/04* (2006.01)

(52) U.S. Cl.
CPC ................... *B64D 39/04* (2013.01)

(58) Field of Classification Search
CPC ......... B64D 39/00; B64D 39/04; F42B 10/04; F42B 10/62; F42B 10/64
See application file for complete search history.

(56) References Cited

U.S. PATENT DOCUMENTS

| 3,111,088 | A | | 11/1963 | Fisk | |
| 4,964,593 | A | * | 10/1990 | Kranz | F42B 10/64 |
| | | | | | 102/208 |
| 5,186,413 | A | * | 2/1993 | Deakin | F41J 9/10 |
| | | | | | 102/388 |
| 5,326,052 | A | | 7/1994 | Krispin et al. | |
| 5,393,011 | A | | 2/1995 | Dunn et al. | |
| 5,393,012 | A | | 2/1995 | Dunn | |
| 6,981,672 | B2 | | 1/2006 | Clancy et al. | |
| 7,219,857 | B2 | | 5/2007 | Takacs et al. | |
| 7,354,017 | B2 | * | 4/2008 | Morris | F42B 10/54 |
| | | | | | 244/3.23 |
| 7,377,468 | B2 | * | 5/2008 | Saggio, III | B64D 39/00 |
| | | | | | 244/1 TD |
| 7,404,530 | B2 | | 7/2008 | Saggio, III et al. | |
| 7,819,361 | B2 | * | 10/2010 | Saggio, III | B64D 39/04 |
| | | | | | 244/1 TD |

(Continued)

OTHER PUBLICATIONS

Ellsworth et al., "Guided Drogue Flight Test Report," Naval Air Systems Command TR E-23027, Sep. 1977.

(Continued)

*Primary Examiner* — Philip J Bonzell
(74) *Attorney, Agent, or Firm* — Mueting, Raasch & Gebhardt, P.A.

(57) ABSTRACT

Systems, apparatus, and methods may control movement of an object through a fluid. The systems, apparatus, and methods may utilize one or more rotatable control units, each including a plurality of control fins to generate a force at least partially perpendicular to a direction of travel of the object through the fluid.

23 Claims, 16 Drawing Sheets

(56) References Cited

U.S. PATENT DOCUMENTS

| | | | |
|---|---|---|---|
| 8,186,623 B2 | 5/2012 | Feldmann | |
| 8,561,947 B2 * | 10/2013 | Feldmann | B64D 39/06 244/135 A |
| 8,733,704 B1 | 5/2014 | Speer et al. | |
| 8,763,955 B1 | 7/2014 | Musgrave et al. | |
| 9,040,885 B2 * | 5/2015 | Morris | F42B 10/62 244/3.24 |
| 2007/0262203 A1 * | 11/2007 | Saggio, III | B64D 39/00 244/135 A |
| 2010/0237196 A1 * | 9/2010 | Saggio, III | B64D 39/00 244/135 A |
| 2012/0168564 A1 * | 7/2012 | Feldmann | B64D 39/06 244/135 A |
| 2012/0211593 A1 * | 8/2012 | Morris | F42B 10/54 244/3.21 |

OTHER PUBLICATIONS

Kuk, Taeseung, "Active Control of Aerial Refueling Drogue," (2014). *Dissertations*. Paper 256.

Kuk et al., "Design, Test and Evaluation of an Actively Stabilized Drogue Refueling System," AIAA-2011-1423, Mar. 2011.

Ro et al., "Active Control of Aerial Refueling Hose-Drogue Systems," AIAA-2010-8400, Aug. 2010.

Williamson et al., "Controllable Drogue for Automated Aerial Refueling," *Journal of Aircraft*, Mar.-Apr. 2010, 47(2): 515-527.

\* cited by examiner

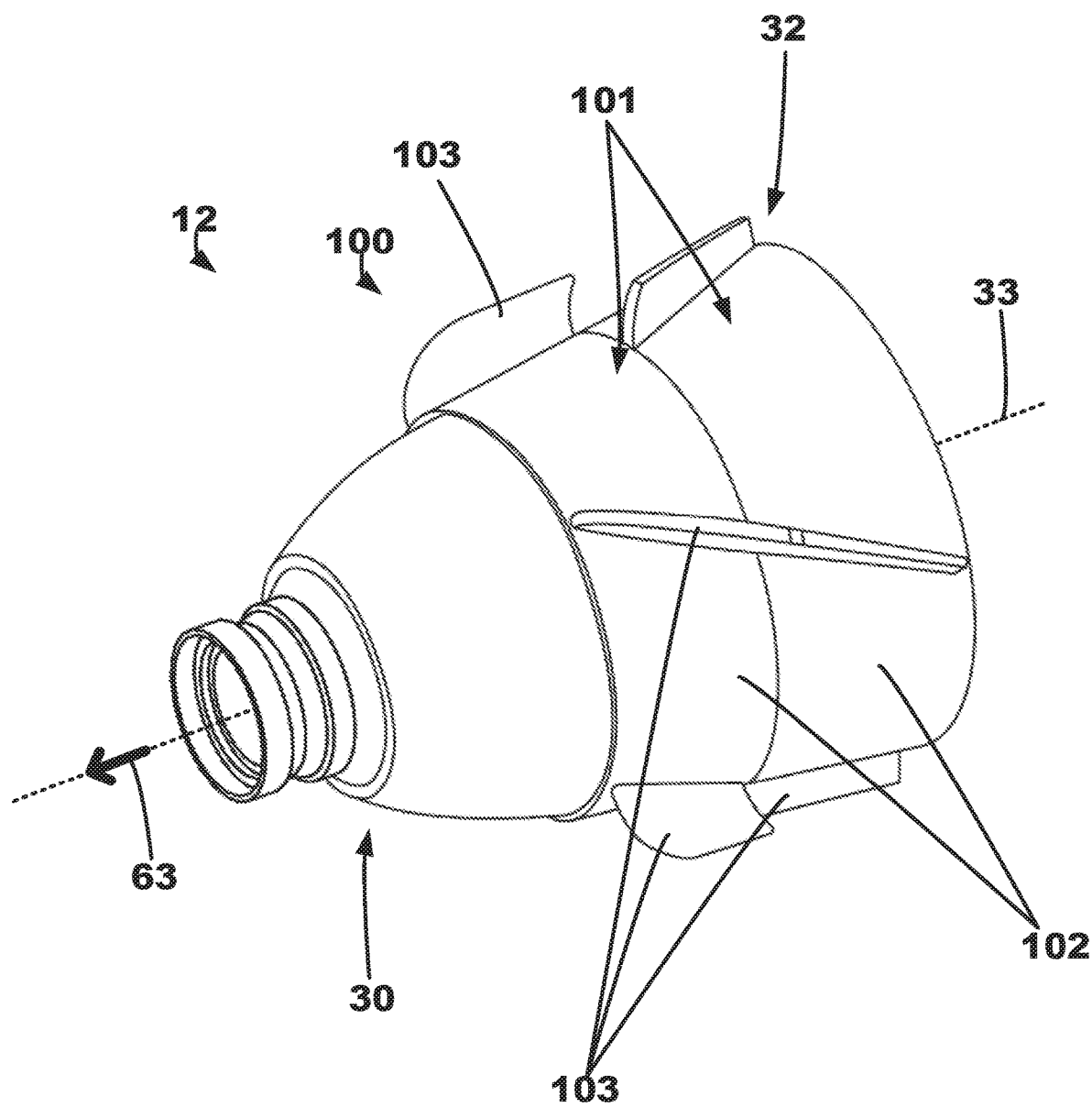

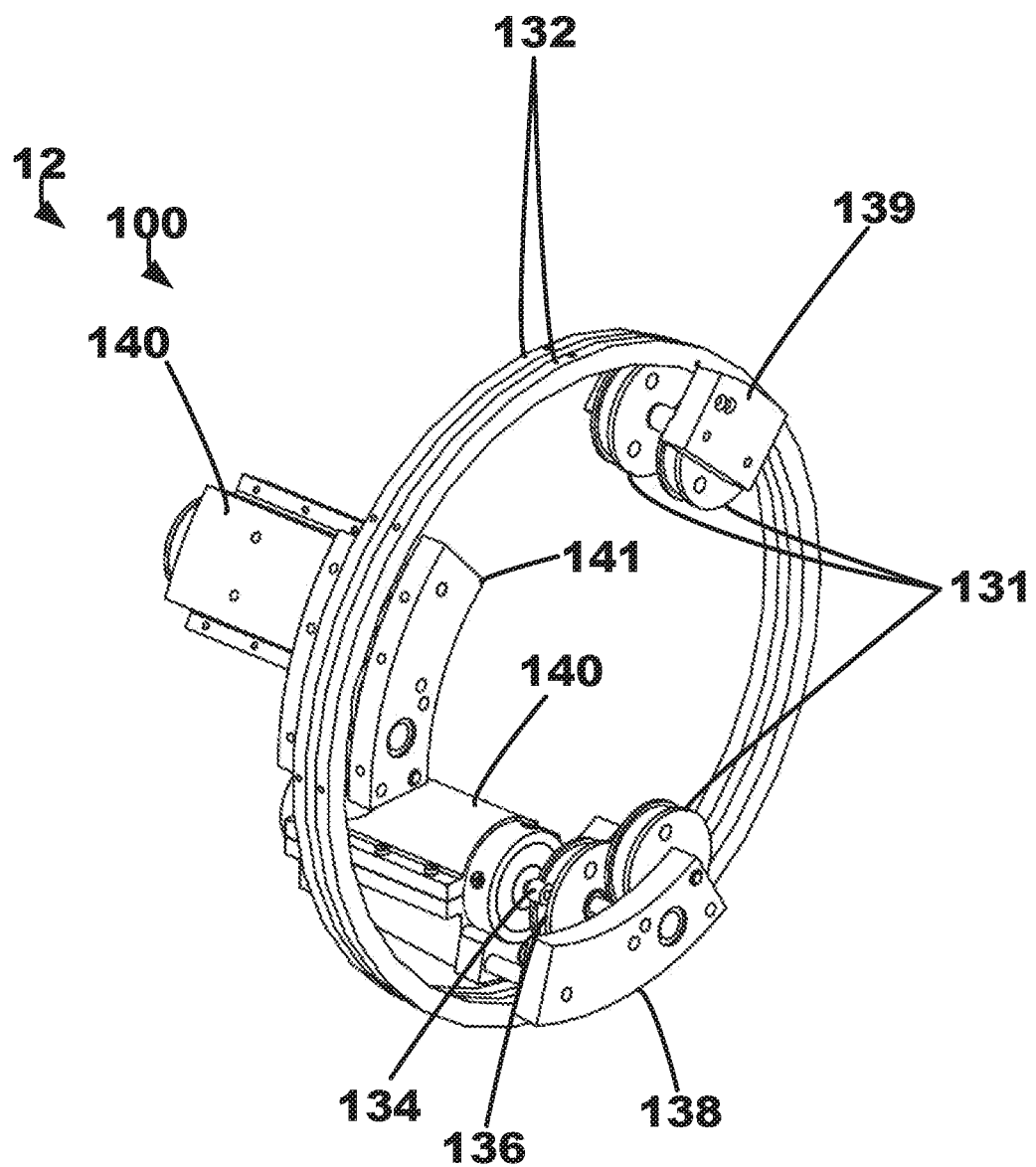

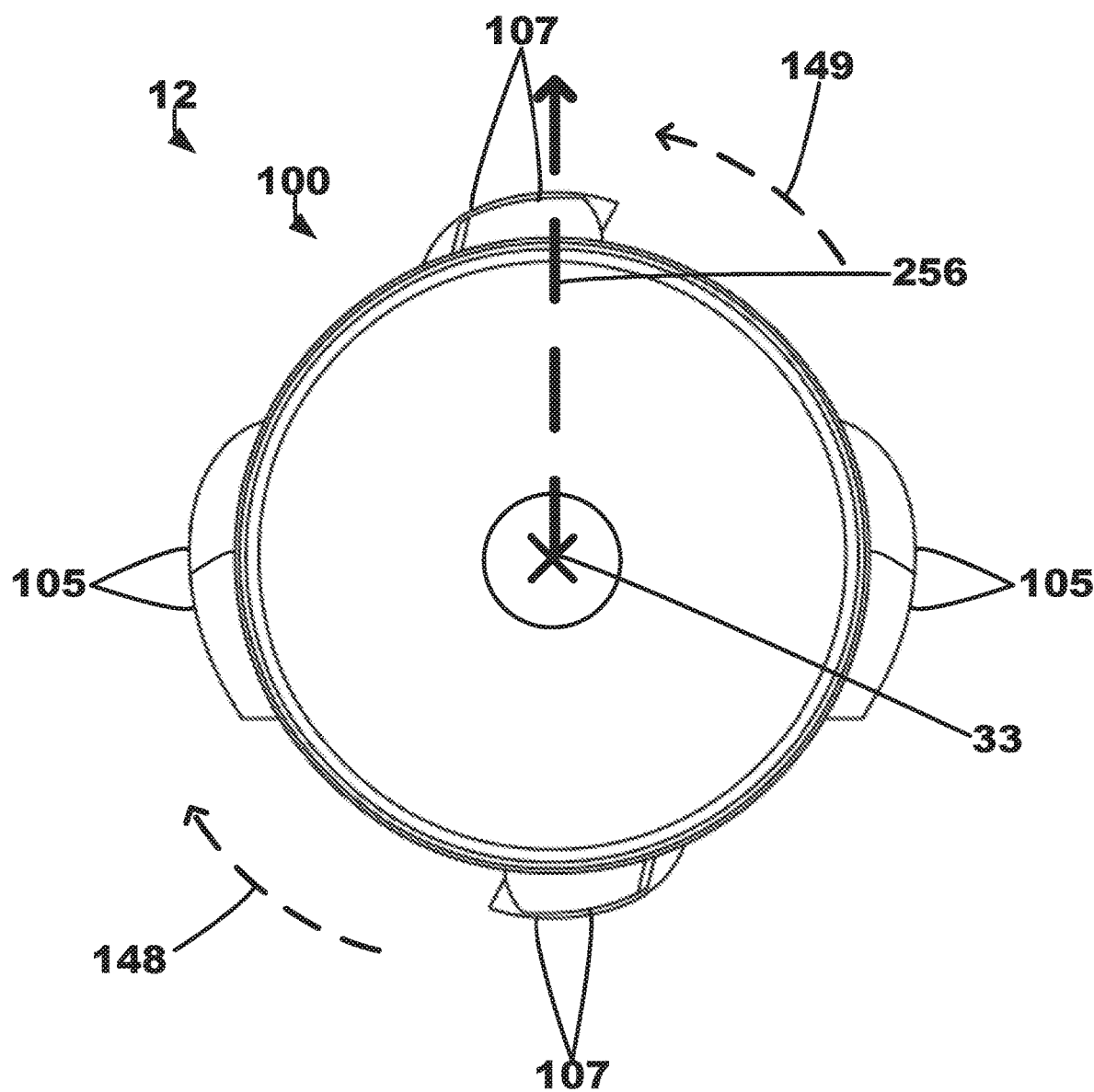

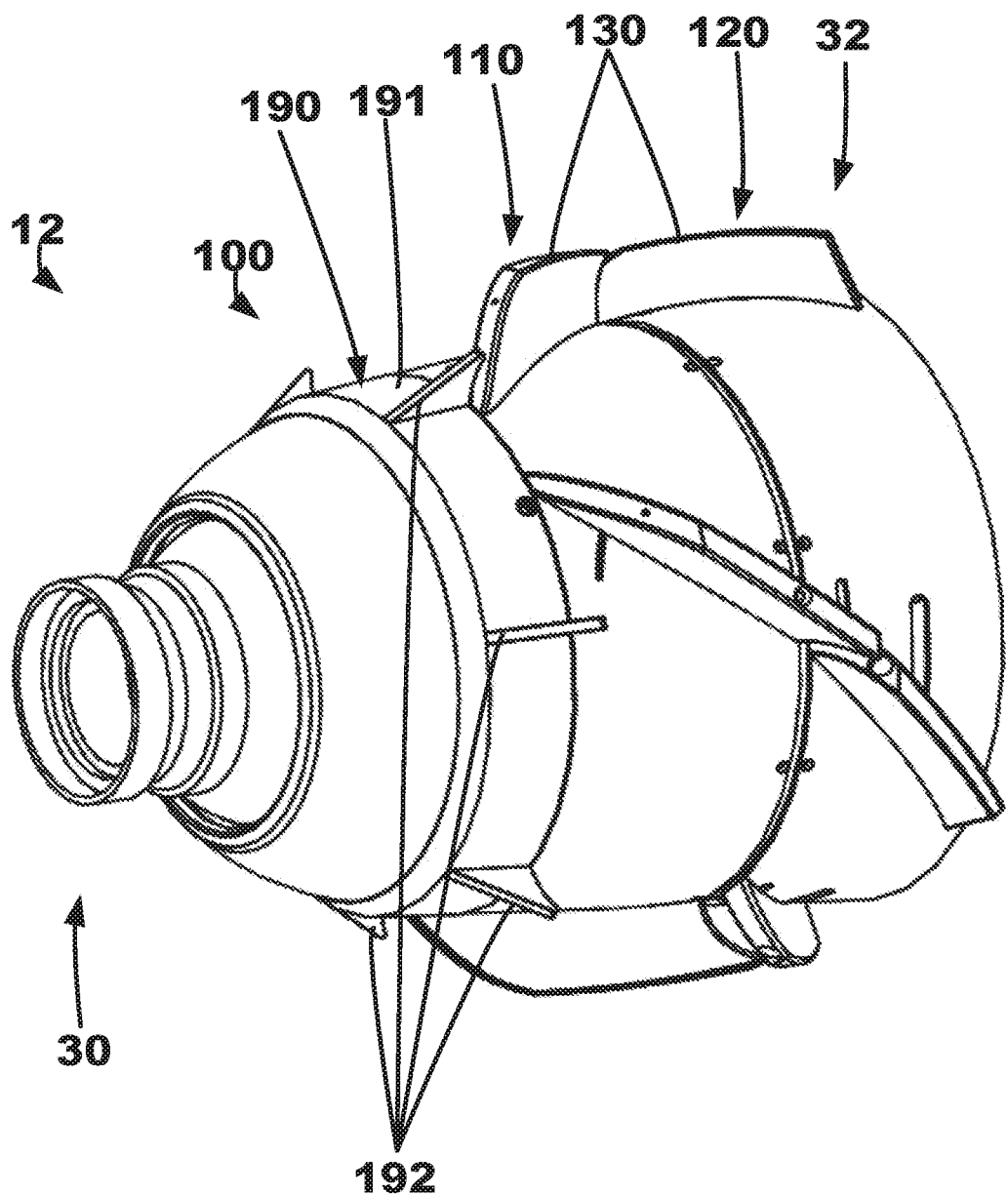

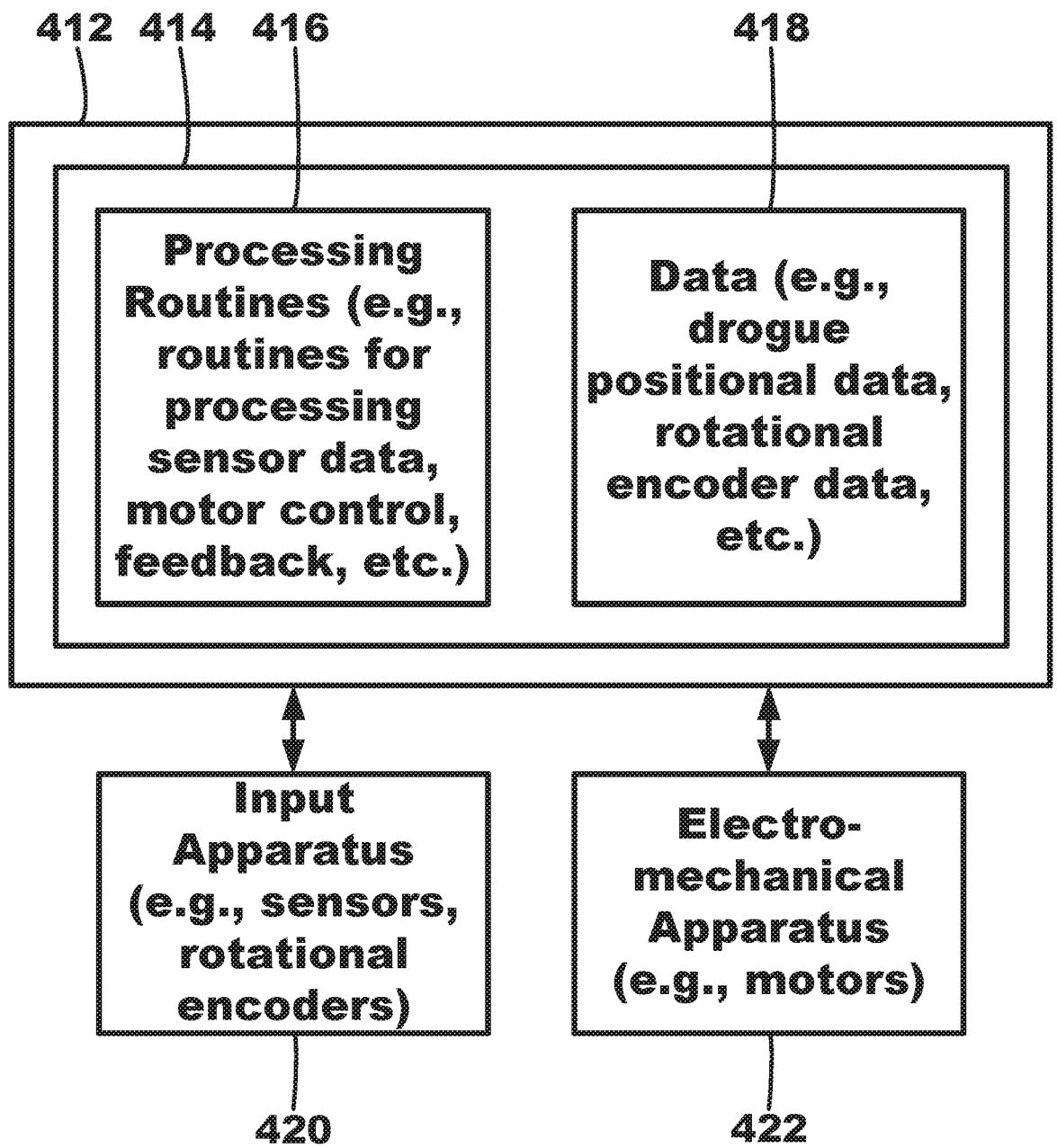

SYSTEMS AND APPARATUS FOR CONTROLLING MOVEMENT OF OBJECTS THROUGH A FLUID

This application claims the benefit of U.S. Provisional Patent Application Ser. No. 62/384,138 filed 6 Sep. 2016, entitled "SYSTEMS AND APPARATUS FOR CONTROLLING MOVEMENT OF OBJECTS THROUGH A FLUID," which is incorporated herein by reference in its entirety.

The present disclosure pertains to systems and apparatus for controlling movement of an object through a fluid. The exemplary systems and apparatus may include one or more rotatable control units coupled to an object such as, e.g., a drogue refueling apparatus, an aircraft, a spacecraft, a water craft, a rocket, a missile, projectile, etc. moving through a fluid (e.g., an atmosphere, a body of water, etc.) and configured to controllably rotate about an axis to control movement of the object through the fluid.

The object, the movement of which may be at least partially controlled, may be a drogue refueling apparatus 10 as shown in FIG. 1, which may be used to refuel aircraft in flight. The drogue refueling apparatus 10 may include a refueling coupling 12, a drogue 13 coupled to the refueling coupling 12, and a fuel hose 14 coupling the refueling coupling 12 to tanker aircraft 15 towing the drogue refueling apparatus 10 through the air. The fuel hose 14 may be described as extending from a forward end portion 17 that is attached, or coupled, to the tanker aircraft 15 to an aft end portion 16 that is attached, or coupled, to the drogue refueling apparatus 10 and, more specifically, the refueling coupling 12 of the drogue refueling apparatus 10. It is to be understood that the fuel hose 14 and the drogue refueling apparatus 10 may be retracted and stowed within or proximate the tanker aircraft 15 and extended, or unfurled, away from the tanker aircraft 15 to position the drogue refueling apparatus 10 so as to be used by another aircraft for refueling. For example, the refueling coupling 12 may be configured to be mated, or operatively coupled, with a corresponding refueling probe 22 of an aircraft 20 to be refueled by the tanker aircraft 15. Once the refueling probe 22 of an aircraft 20 is properly mated, or operatively coupled, to the refueling coupling 12, the aircraft 20 may be refueled through the fuel hose 14. In other words, the aircraft 20 may be described as being equipped with a refueling probe 22 that can plug into the refueling coupling 12 to provide a flow path for fuel from the tanker aircraft 15 through the fuel hose 14, the refueling coupling 12, and the refueling probe 22 into the aircraft 20.

Typically, drogue refueling apparatus, and components thereof, may be described as passive such that they are subject to motion induced by one or more of atmospheric turbulence, tanker wake, tanker motion, and receiver forebody effects. Such motion may make it difficult for aircraft to successfully and efficiently mate with the drogue refueling apparatus for refueling. Additionally, such motion may increase the likelihood of higher-than-nominal impact loads between a refueling probe of an aircraft and such drogue refueling apparatus, which may result in damage to one or both of a refueling probe of the aircraft and the drogue refueling apparatus.

SUMMARY

The exemplary systems and apparatus may be described as being configured to actively stabilize the drogue refueling apparatus to reduce this induced motion which may significantly increase the success rate, safety, and cost effectiveness of aerial refueling for both manned and unmanned receiver aircraft. By presenting a more stable target to the receiver aircraft, the exemplary systems and apparatus may be described as being able to significantly reduce the probability of missed contact, which may reduce the time required to refuel each aircraft in a squadron (which, in turn, may allow each tanker aircraft to support a greater number of aircraft to be refueled and/or reduce the time and fuel wasted by the squadron waiting for the last aircraft of the squadron to refuel).

The stability provided by the exemplary systems and apparatus may also be described as reducing the tendency for higher-than-nominal closure rates and off-center contacts that can result in damage to the drogue refueling apparatus, the refueling probe, and the refueling aircraft. This can lead to significant improvements in safety and cost for all manned and unmanned aircraft, but may be especially significant for FOD (foreign object debris) sensitive aircraft such as, e.g., the LOCKHEED MARTIN F-35 Lightning II and the BELL BOEING V-22 Osprey. A stabilized drogue refueling apparatus may be described as an important piece of technology to achieve operationally acceptable efficiency for automated aerial refueling. The exemplary systems and apparatus may also be described as being configured to move the drogue refueling apparatus to a desired position relative to the tanker aircraft or the receiver aircraft based on control inputs.

The disclosed systems and apparatus can also be applied to other non-refueling systems that may utilize the generation of a control force on a body moving through a fluid medium. Typical examples include missiles, artillery shells, and torpedoes. Another exemplary case may be the use of a drogue-controlled tether to facilitate the capture of one aircraft by another aircraft in flight.

The exemplary systems and apparatus may be described as using one or more rotatable, or rotating, control units, each with a pair of fixedly-integrated control fins and one or more internal motors to generate power and control the roll angle of that rotatable, or rotating, control unit. In at least one embodiment, the exemplary systems and apparatus may include two independent rotatable control units that are directly integrated with the refueling coupling. Further, in the exemplary systems and apparatus, the magnitude and direction of the control force may be varied by changing the roll angle of the two rotatable control units (e.g., with respect to one another, with respect to the axis upon which the rotatable control units rotates, etc.).

As the control units are pulled through the air (e.g., by a fuel hose of drogue refueling apparatus), each pair of fins (e.g., fixedly-integrated control fins) may create a fixed control force in a direction at least partially perpendicular to a longitudinal axis of the refueling coupling of the drogue refueling apparatus. When the maximum net control force is desired, the forward fins may be aligned with the aft fins. If a lower magnitude force is desired in the same direction, the two control units may be counter-rotated approximately, or about, an equal amount. The minimum net control force may be produced when the control units are oriented approximately, or about, 180° apart. To change the direction of the net force, the two control units may be rotated while maintaining the same relative angle between themselves.

Still further, in one or more embodiment, the system may include, or use, sensors (e.g., sensors within the rotatable control units, sensors external from the rotatable control units such as, for example, on the refueling tanker, etc.) that measure the motion of the rotatable control unit in flight. In flight, such sensors may measure the motion of the drogue refueling apparatus, and more specifically, the refueling coupling of the drogue refueling apparatus. This information may be used to send commands to the motors to vary the roll angle of each control unit to achieve the net control force vector used to stabilize the drogue.

And still further, in one or more embodiment, the system may include, or use, sensors (e.g., sensors within the rotatable control units, sensors external from the rotatable control units such as, for example, on the refueling tanker, etc.) that measure the position of the rotatable control unit relative to the tanker aircraft or the receiver aircraft in flight. This information may be used to send commands to the motors to vary the roll angle of each control unit to achieve the net control force vector used to position the drogue relative to the tanker aircraft or the receiver aircraft.

In addition to the pair of control fins, a pair of roll fins may be fixedly integrated with each control unit. When the exemplary systems and apparatus are not being used to actively stabilize the system and/or drogue refueling apparatus, torque generated by each pair of roll fins (e.g., passing through a fluid medium such as air) may be used to spin, rotate, the control units' internal motor and generate electrical energy, which may be stored in a bank of internal capacitors for later use, e.g., during periods of active stabilization.

The exemplary systems and apparatus may be described as being advantageous because, e.g., the control units may be integrated with the refueling coupling of exemplary drogue refueling apparatus, the exemplary systems and apparatus may be compatible with all drogue refueling apparatus-based tankers in the United States' inventory and most foreign tankers, the control approach of the exemplary systems and apparatus may be described as being more effective in stabilizing the drogue refueling apparatus than other approaches, etc.

The exemplary systems and apparatus may include and use control fins that are fixedly integrated with each rotating shroud and/or rotatable control unit. In one or more embodiments, one pair of control fins generates both a control force and a rolling moment. In one or more embodiments, one pair of control fins may generate a control force while another pair of control fins generates a rolling moment. In one or more embodiments, the control fins may be sized so they can fit into the tanker without having to deform, fold, deflect, move with respect to the control unit body, or change geometry. In one or more embodiments, the magnitude and direction of the effective control force applied to the coupling and drogue may be tailored by varying the roll angle of each rotating shroud or rotatable control unit.

One exemplary system for controlling movement of an object may include a forward rotatable control unit to controllably rotate about an axis in a first or second rotational direction to assist in moving the object in a direction at least partially perpendicular to the axis and an aft rotatable control unit to controllably rotate about the axis in the first or second rotational direction to assist in moving the object in a direction at least partially perpendicular to the axis. The aft rotatable control unit may be positioned at least partially rearward from the forward rotatable control unit along a direction of travel of the object. Each of the forward and aft rotatable control units may include a body portion rotatably couplable to the object and one or more resilient fins fixedly extending from the body portion. The one or more resilient fins may be resilient to deflection as the object moves along the direction of travel.

In one or more embodiments, the one or more resilient fins of each of the forward and aft rotatable control units may include a first control fin and a second control fin. The first and second control fins of the forward and aft rotatable control units may be positioned with respect to each other by selectively rotating the body portion of the respective forward and aft rotatable control units with respect to each other to selectively generate a force at least partially perpendicular to the axis to move the object in the direction of the force. Further, the forward and aft rotatable control units may be positionable with respect to each other to align the first control fins and to align the second control fins to selectively generate a first force at least partially perpendicular to the axis, and the forward and aft rotatable control units may be positionable with respect to each other to position the first control fins to be unaligned and the second control fins to be unaligned to selectively generate a second force at least partially perpendicular to the axis. The first force may be greater than the second force.

In one or more embodiments, the one or more resilient fins fixedly extend from the body portion along one or more fin planes. A first forward control deflection angle may be defined between the fin plane of the first control fin of the forward rotatable control unit and the axis and a first aft control deflection angle may be defined between the fin plane of the first control fin of the aft rotatable control unit and the axis. The first forward and the first aft fins may generate a rotational force about the axis in the first rotational direction as the object moves along the direction of travel. The second forward control deflection angle may be defined between the fin plane of the second control fin of the forward rotatable control unit and the axis and a second aft control deflection angle may be defined between the fin plane of the second control fin of the aft rotatable control unit and the axis. The second forward and the second aft fins may generate a rotational force about the axis in the second rotational direction as the object moves along the direction of travel. In at least one embodiment, the first and second forward control deflection angles may be less than the first and second aft control deflection angles. In at least one embodiment, the first and second forward control deflection angles may be greater than the first and second aft control deflection angles. In at least one embodiment, the first forward control deflection angle may be greater than the second forward control deflection angle. In at least one embodiment, the first forward control deflection angle may be less than the second forward control deflection angle. In at least one embodiment, the first aft control deflection angle may be greater than the second aft control deflection angle. In at least one embodiment, the first aft control deflection angle may be less than the second aft control deflection angle.

In one or more embodiments, the forward and aft rotatable control units may be positionable with respect to each other to selectively generate the magnitude of a force at least partially perpendicular to the axis. Further, in one or more embodiments, the forward and aft rotatable control units may be positionable with respect to the object to selectively generate the direction of a force at least partially perpendicular to the axis.

In one or more embodiments, the one or more resilient fins of at least one of the forward control unit and the aft control unit comprises at least one roll fin to generate rotational force about the axis in the first or the second direction. In one or more embodiments, the one or more resilient fins of the forward control unit may include at least one roll fin to generate rotational force about the axis in the first direction, and the one or more resilient fins of the aft control unit may include at least one roll fin to generate rotational force about the axis in the second direction. Further, the one or more resilient fins may fixedly extend from the body portion along one or more fin planes. A forward roll deflection angle may be defined between the fin plane of the at least one roll fin of the forward rotatable control unit and the axis and an aft roll deflection angle may be defined between the fin plane of the at least one roll fin of the aft rotatable control unit and the axis. The forward roll deflection angle may be the same as the aft roll deflection angle. In other embodiments, the forward roll deflection angle may be greater than the aft roll deflection angle. In other embodiments, the forward roll deflection angle may be less than the aft roll deflection angle.

In one or more embodiments, the forward and aft rotatable control units may controllably rotate about the axis to assist in moving a refueling coupling of a drogue refueling apparatus in a direction at least partially perpendicular to the axis, and the body portion of each of the forward and aft rotatable control unit may be couplable to the refueling coupling between a drogue of the drogue refueling apparatus and a forward region of the refueling coupling.

In one or more embodiments, the forward and aft rotatable control units may controllably rotate about the axis to assist in moving a refueling coupling of a drogue refueling apparatus in a direction at least partially perpendicular to the axis, and the body portion of each of the forward and aft rotatable control units may define an outer shroud surface of the refueling coupling of the drogue refueling apparatus.

In one or more embodiments, the system may further include one or more electric motors operably coupled to the forward and aft rotatable control units to rotate the forward and aft rotatable control units about the axis and a controller including one or more processors and operably coupled to the one or more motors. The controller may be configured to selectively control the rate of rotation of the forward and aft rotatable control units to selectively move the object in a direction at least partially perpendicular to the axis. Further, the system may include one or more electricity storage units. The one or more electric motors may be operably coupled to the one or more electricity storage units and to the forward and aft rotatable control units to generate electricity to be stored in the electricity storage units when the forward and aft rotatable control units rotate about the axis.

In one or more embodiments, the body portion and the one or more resilient fins may be integrally molded to define each of the forward and aft rotatable control units. In one or more embodiments, the system may further include a transition fence portion positioned forward of the forward rotatable control unit to position the one or more resilient fins of the forward and aft rotatable units away from storage apparatus.

One exemplary system for controlling movement of a drogue refueling apparatus may include one or more rotatable control units couplable between forward and rear regions of a refueling coupling of a drogue refueling apparatus and to controllably rotate about an axis to assist in moving the drogue refueling apparatus in a direction at least partially perpendicular to the axis. Each of the one or more rotatable control units may include a body portion rotatably couplable to the refueling coupling and a plurality of resilient fins fixedly extending from the body portion. The plurality of resilient fins may be resilient to deflection as the drogue refueling apparatus moves along the direction of travel.

In one or more embodiments, the one or more rotatable control units may include forward rotatable control unit to controllably rotate about the axis in a first or second rotational direction to assist in moving the object in a direction at least partially perpendicular to the axis and an aft rotatable control unit to controllably rotate about the axis in a first or second rotational direction to assist in moving the object in a direction at least partially perpendicular to the axis. The aft rotatable control unit may be positioned at least partially rearward from the forward rotatable control unit along a direction of travel of the drogue refueling apparatus. Further, the system may further include a transition fence portion coupled to the forward end region of the refueling coupling of the drogue refueling apparatus to contact at least a portion of a storage tube to position the plurality of resilient fins of the one or more rotatable units away from the storage apparatus (e.g., storage tube).

In one or more embodiments, the plurality of resilient fins of the one or more rotatable control units may be sized to fit within a refueling tanker storage tube without being moved with respect to the body portion. In one or more embodiments, the system may be a retrofit kit to retrofit an object (e.g., a drogue refueling coupling) for use in controlling movement of the object.

The above summary of the present disclosure is not intended to describe each embodiment or every implementation thereof. Advantages, together with a more complete understanding of the present disclosure, will become apparent and appreciated by referring to the following detailed description and claims taken in conjunction with the accompanying drawings.

BRIEF DESCRIPTION OF THE DRAWINGS

FIG. 3A is a perspective view of the refueling coupling of FIGS. 2A-2B including a pair of exemplary rotatable control units.

FIG. 3C is a perspective view of the internal apparatus including motors and gears configured to rotate and support the pair of rotatable control units of FIGS. 3A-3B.

FIG. 4C is a rear view of the refueling coupling and exemplary rotatable control units of FIGS. 4A-4B.

FIG. 7 is a perspective view of the refueling coupling including a pair of exemplary rotatable control units of FIGS. 2A-2B including a transition fence portion.

FIG. 9 is a block diagram of an exemplary system for use in controlling movement of an object through a fluid using, e.g., the exemplary control units of FIGS. 3-8.

DETAIL DESCRIPTION OF EXEMPLARY EMBODIMENTS

Figure 1:
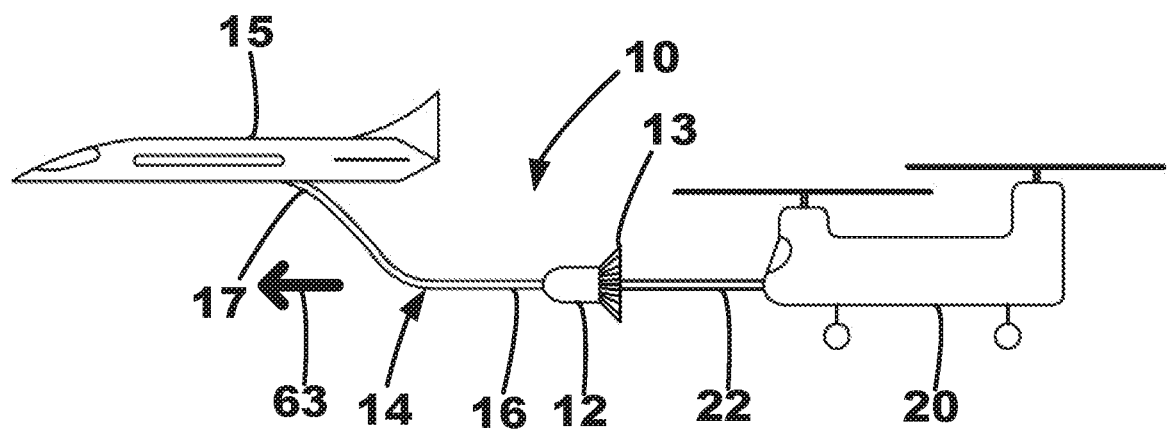
FIG. 1 is a diagrammatic view of a refueling tanker refueling an aircraft using a drogue refueling apparatus.

In the following detailed description of illustrative embodiments, reference is made to the accompanying figures of the drawing which form a part hereof, and in which are shown, by way of illustration, specific embodiments which may be practiced. It is to be understood that other embodiments may be utilized and structural changes may be made without departing from (e.g., still falling within) the scope of the disclosure presented hereby.

Exemplary systems, apparatus, and methods for use in controlling movement of objects moving through a fluid or fluid medium shall be described with reference to FIGS. 1-9. It will be apparent to one skilled in the art that elements or processes from one embodiment may be used in combination with elements or processes of the other embodiments, and that the possible embodiments of such systems, apparatus, and methods using combinations of features set forth herein is not limited to the specific embodiments shown in the Figures and/or described herein. Further, it will be recognized that the embodiments described herein may include many elements that are not necessarily shown to scale. Still further, it will be recognized that timing of the processes and the size and shape of various elements herein may be modified but still fall within the scope of the present disclosure, although certain timings, one or more shapes and/or sizes, or types of elements, may be advantageous over others.

Figure 2A:
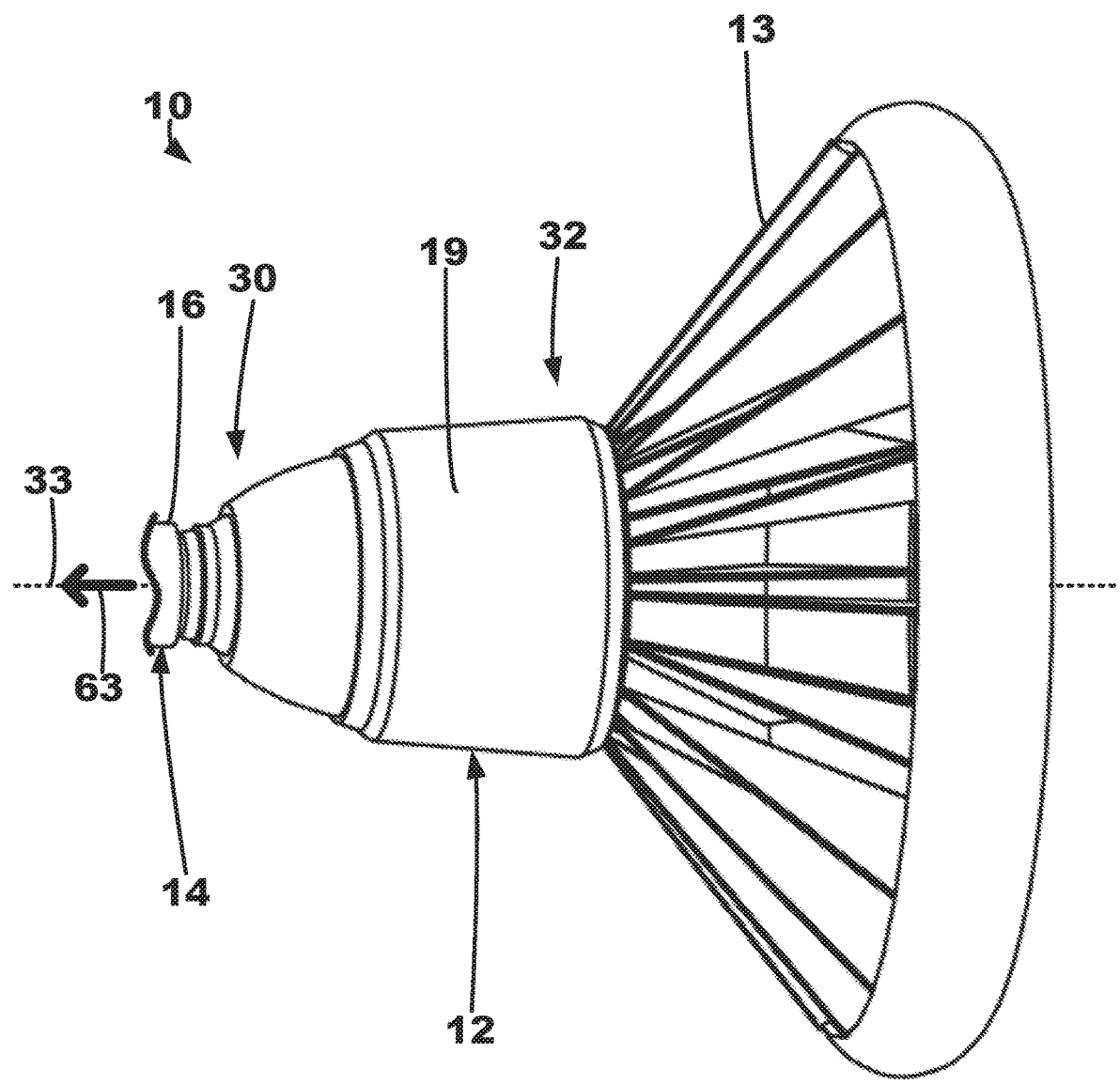
FIG. 2A is side view of an exemplary refueling coupling and a drogue of the drogue refueling apparatus of FIG. 1.

An exemplary refueling coupling 12 and drogue 13 of the drogue refueling apparatus 10 of FIG. 1 is depicted in FIG. 2A. The exemplary apparatus, systems, and methods may be described as being capable of retro-fitting the exemplary refueling coupling 12 to be able to control the movement of the drogue refueling coupling 12 and associated parts or portions. In other words, the exemplary apparatus and systems may be coupled, or attached, to the refueling coupling 12 to provide movement control functionality as described herein. Further, one or more portions of the refueling coupling 12 may be removed and replaced with one or more portions of the exemplary systems and apparatus as will be also described herein. The exemplary apparatus, systems, and methods may be further described as a retrofit kit for use with drogue refueling apparatus such that existing users may purchase the retrofit kit to retrofit their drogue refueling apparatus.

Although the exemplary systems, apparatus, and methods are primarily described herein with respect to the drogue refueling apparatus 10, and more specifically, a drogue refueling coupling 12, it is to be understood that the exemplary systems, apparatus, and methods may be used with, or operated in conjunction with, other objects moving through a fluid or fluid medium (such as, e.g., air, water, etc.) For example, the exemplary systems, apparatus and methods may be used with aircraft, spacecraft, water craft, rockets, missiles, projectiles, torpedoes, etc.

The refueling coupling 12 of FIG. 2A may be described as extending from a forward region 30 to an aft region 32 along an axis 33. The forward region 30 may be coupled, or attached, to the aft end portion 16 of the fuel hose 14 and the aft region 32 may be coupled, or attached, to the drogue 13.

As described herein, the refueling coupling 12 may move through the air while being towed by a tanker aircraft 15 via a fuel hose 14. When being towed through the air, the refueling coupling 12 may be described as moving along a direction of travel 63 that may be the same or similar to the axis 33. Various portions of the exemplary systems and apparatus may be described herein with respect to the axis 33 of the refueling coupling 12 and the direction of the travel 63 of the refueling coupling 12. Although the axis 33 of the refueling coupling 12 and the direction of travel 63 of the refueling coupling 12 may not always be the same depending on various factors (such as, e.g., travel speed, wind conditions, etc.), it is to be understood that the axis 33 of the refueling coupling 12 and the direction of the travel 63 may be used relatively interchangeably when, e.g., describing the rotational movements and/or forces applied by the exemplary systems and apparatus to move the refueling coupling 12.

Figure 2B:
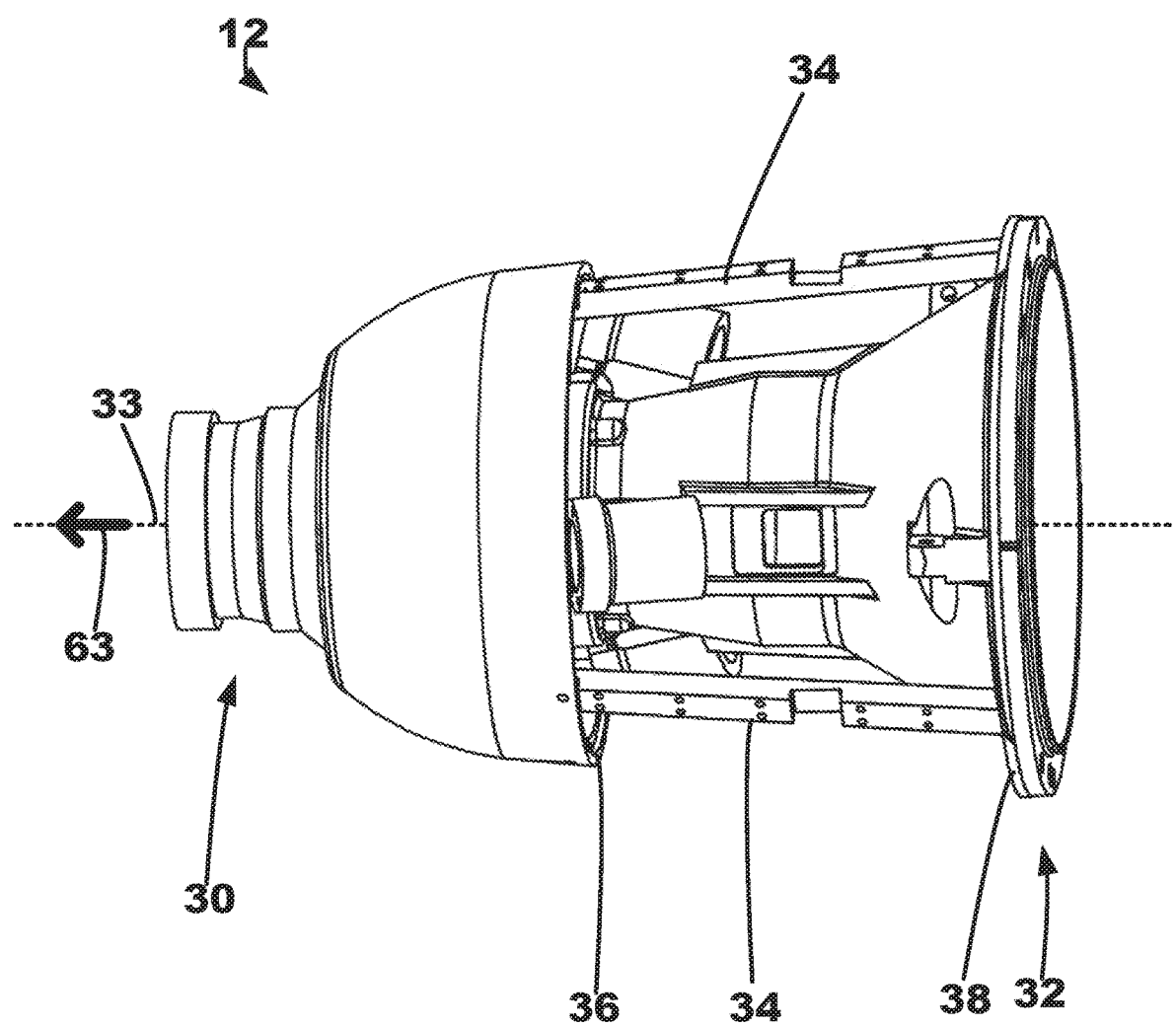
FIG. 2B is the side view of the refueling coupling of the drogue refueling apparatus of FIG. 2A with the shroud removed from the refueling coupling.

Further, although not described in further detail herein, the refueling coupling 12 may include any apparatus configured to, or operable to, facilitate the functionality of the refueling coupling 12 such as e.g., mating and un-mating with the refueling probe 22 of an aircraft 20, etc. The refueling coupling 12 may include one or more shroud portions 19, which as shown in FIG. 2B, may be removed to reveal, or expose, one or more internal components of the refueling coupling 12. The exemplary systems and apparatus as described further herein may be attached to the refueling coupling 12 through, or via, one or more of the internal components of the refueling coupling 12. For example, the exemplary systems and apparatus may include three longitudinal braces 34, a forward mounting ring 36, and an aft mounting ring 38 that are coupled to one or more portions or components of the refueling coupling 12 as will be described and shown in more detail with reference to FIG. 3B.

The drogue refueling apparatus 10 including the refueling coupling 12 and the drogue 13 may be described as passive components that are subject to motion induced by atmospheric turbulence, tanker wake, tanker motion, and aircraft receiver forebody effects. The exemplary systems and apparatus may be described as being configured to actively stabilize the drogue refueling apparatus 10 to reduce the induced motion, and to significantly increase the success rate, safety, and cost effectiveness of aerial refueling for both manned and unmanned receiver aircraft. The exemplary systems and apparatus may also be described as being configured to move the drogue refueling apparatus to a desired position relative to the tanker aircraft or the receiver aircraft based on control inputs.

An exemplary system 100 for controlling movement of an object such as the refueling coupling apparatus 10, and more specifically, the refueling coupling 12, of FIGS. 1-2, moving through a fluid is depicted in FIGS. 3-7. The exemplary system 100 includes a pair of, or two, rotatable control units 101 that are rotatably coupled to the refueling coupling 12. In other embodiments, one rotatable control unit 101 or more than two rotatable control units 101 may be utilized. For example, the exemplary system 154 described further herein with reference to FIG. 8 includes a single rotatable control unit 155. Each of the rotatable control units 101 may be configured to rotate about the axis 33 of the refueling coupling 12 in a first or second rotational direction (i.e., clockwise or counterclockwise, respectively) to provide various functionality to the exemplary system 100. For example, the rotatable control units 101 may be configured to rotate about the axis 33 of the refueling coupling 12 in a first or second rotational direction to assist in moving the refueling coupling 12 in a direction at least partially perpendicular to the axis 33 and/or the direction of travel 63 of refueling coupling 12. Further, for example, the rotatable control units 101 may be configured to rotate about the axis 33 of the refueling coupling 12 in a first or second rotational direction to generate electricity e.g., to be stored in electricity storage units for use by one or more electric motors as further described herein.

The pair of rotatable control units 101 shown in the exemplary system 100 may be labeled, or named, as a forward rotatable control unit 110 and an aft rotatable control unit 120. The forward rotatable control unit 110 may be described as being positioned at least partially forward from (e.g. in front of, upstream of, etc.) the aft rotatable control unit 120 along the direction of travel 63 of the refueling coupling 12. Conversely, the aft rotatable control unit 120 may be described as being positioned at least partially rearward from (e.g. behind, downstream of, etc.) the forward rotatable control unit 110 along the direction of travel 63 of the refueling coupling 12. Additionally, the forward rotatable control unit 110 may be described as being closer to the fuel hose 14 and further away from the drogue 13 than the aft rotatable control unit 120. Conversely, the aft rotatable control unit 120 may be described as being closer to the drogue 13 and further away from the fuel hose 14 than the forward rotatable control unit 110. Still further, as described herein, the refueling coupling 12 may be described as extending from a forward region 30 to an aft region 32, and the rotatable control units 110, 120 may be described as being coupled to the refueling coupling 12 between the forward region 30 and the aft region 32. In other words, in this embodiment, the rotatable control units 110, 120 may be contained within the length, or bounds, of the refueling coupling 12 and, for example, not located beyond either end of the refueling coupling 12 (e.g., the ends that terminate the length, or bounds, of the refueling coupling 12 along the axis 33). For instance, the exemplary rotatable control units 110, 120 are not located in front of or behind the refueling coupling 12 along the direction of travel 63 or axis 33.

In another embodiment (not depicted), the rotatable control units 101 may be attached, or coupled, to the drogue refueling apparatus 10 in front of, or upstream from, the refueling coupling 12, e.g., between the refueling coupling 12 and the fuel hose 14. In other words, it may be described that the rotatable control units 101 may be mounted just forward of the refueling coupling 12. Further, it may be described that the rotatable control units 101 may be located, or positioned, upstream from the refueling coupling 12 when the refueling coupling 12 is moving along the direction of travel 63.

To assist in moving the refueling coupling in a direction at least partially perpendicular to the axis 33, each of the rotatable control units 101 may include a body portion 102 and a plurality of fins 103 coupled to and extending from the body portion 102. The body portion 102 may be the portion, or part, of the rotatable control units 101 that is rotatably coupled to the refueling coupling 12 (e.g., rotatably coupled to the refueling coupling 12 via, or using, one or more additional components or portions of the system 100). The body portion 102 may be described as being hollow such that, e.g., one or more components of the refueling coupling 12 and/or system 100 may be located therein. Further, although as shown the body portion 102 is conical, or defining a conical shape, in other embodiments, the body portion 102 may define any arbitrary outer profile that is axisymmetric. The body portion 102 may include (e.g., be formed of) one or more materials such as, e.g., aluminum, titanium, steel, carbon fiber, fiberglass, polymer, plastic, rubber, composite, and combinations thereof. The body portions 102 may be described as effectively replacing the shroud portion(s) 19 of the refueling coupling 12 such that the body portion 102 of each of the forward and aft rotatable control units 110, 120 may define an outer shroud surface of the refueling coupling 12 of the drogue refueling apparatus 10.

The body portions 102 may be rotatably coupled to the refueling coupling 12 in various ways. In the embodiment depicted in FIGS. 3A-3C, the system 100 includes a plurality of bearings 130, which support the body portions 102 of the forward and aft rotatable control units 110, 120 such that the body portions 102 may rotate about the axis 33. Further, each rotatable control unit 110, 120 may include a ring gear 132 that is fixedly coupled to the body portion 102 such that the ring gears 132 rotate with the corresponding rotatable control unit 110, 120. The ring gears 132 may be also supported by a plurality of support and idler gears 131, 136 of the system 100 as will be described further herein.

Further, each of the rotatable control units 110, 120, and more specifically, the body portions 102 thereof, may be operably coupled to one or more electric motors 140, e.g., to generate electricity when the rotatable units 110, 120 rotate, to selectively control the rate of rotation of the forward and aft rotatable control units 110, 120 to selectively move the refueling coupling 12 in a direction at least partially perpendicular to the axis 33, etc. The rotatable control units 110, 120 may be operably coupled to the one or more electric motors 140 in various ways as shown in FIG. 3C. In this embodiment, the rotatable control units 110, 120 are operatively, or mechanically, coupled to the one or more electrical motors 140 via the ring gears 132. The electrical motors 140 may be operatively, or mechanically, coupled to pinion gears 134 and idler gears 136, which in turn, may be operatively, or mechanically, coupled the ring gears 132.

In other words, the forward rotatable control unit 110 including the forward ring gear 132 may rotate on three forward bearings 130 and a plurality of support and idler gears 131, 136. Further, the aft rotatable control unit 120 including the aft ring gear 132 may rotate on three aft bearings 130 and a plurality of support and idler gears 131, 136. The forward ring gear 132 may be driven by a forward motor 140 through a forward pinion gear 134 and a forward idler gear 136. Further, the aft ring gear 132 may be driven by an aft motor 140 through an aft pinion gear 134 and an aft idler gear 136.

The forward motor 140, the forward idler gear 136, and an aft support gear 131 may be included in, or contained by, a forward mid-bearing assembly 138. Further, a forward support gear 131 and an aft support gear 131 may be included in, or contained by, a non-idler assembly 139. An aft motor 140, an aft idler gear, and a forward support gear may be included in, or contained by, an aft mid-bearing assembly 141. Further, the forward ring gear 132 may be supported by the forward idler gear 136 and two forward support gears 131 (one labeled), and the aft ring gear 132 may be supported by the aft idler gear and two aft support gears 131.

Figure 3B:
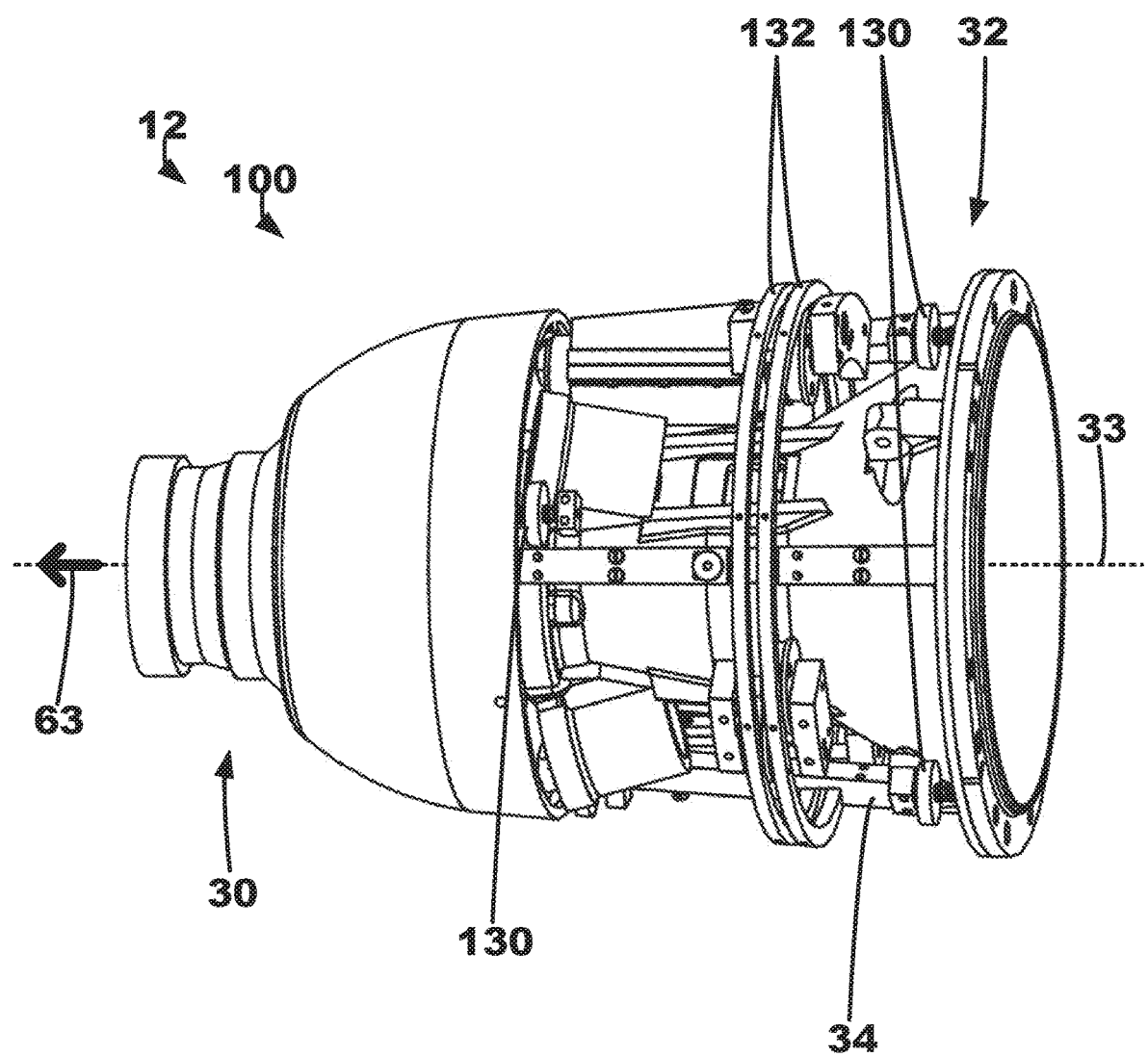
FIG. 3B is a perspective view of the refueling coupling of FIGS. 2A-2B including the pair of rotatable control units without body portions and fins.

Each of the assemblies 138, 139, 141 may be fixedly coupled to one or more portions of the refueling coupling 12 as shown in FIG. 3B. More specifically, the system 100 may include a plurality of longitudinal braces 34 that are configured to be fixedly coupled to the refueling coupling 12 and/or parts thereof to facilitate the mounting, or attachment, of the assemblies 138, 139, 141 as well as other portions of the system 100. Although not depicted, the exemplary system 100 may further include forward and aft mounting cones located between the forward and aft rotatable control units 110, 120 and the interior space within the refueling coupling 12. The forward and aft mounting cones may include apertures, or openings, through which the gears and bearings described herein may protrude or be located within to couple the rotatable control units 110, 120 to the remainder of the system 100. The forward and aft mounting cones may be described as improving heat transfer from the internal components and helping prevent damage to the rotatable control units 110, 120.

As described herein, each of the rotatable control units 101 may include a plurality of fins 103 to assist in moving the refueling coupling in a direction at least partially perpendicular to the axis 33. The plurality of fins 103 may be coupled to and extend from the body portions 102 of the forward and aft rotatable control units 110, 120. The fins 103 may be "fixed" (e.g., fixedly coupled, fixedly extending therefrom, rigid, resilient, etc.) with respect to the body portion 102 such that the fins 103 may not move (e.g., at least resistant to movement) relative to the body portion 102 as will be described further herein. Further, the fins 103 may be described as being resilient or resistant (e.g., rigid) to deflection as the refueling coupling 12 moves along the direction of travel 63. In other words, the fluid through which the refueling coupling 12 and the system 100 are traveling such as, e.g., air, may act on, or apply a force to, the fins 103, which in turn, may apply a rotational moment and/or force to the body portion 102, as will be described further herein.

Additionally, in one or more embodiments, the fins 103 may be impact-resistant and/or shatter-resistant. The fins 103 may include one or more materials such as, e.g., aluminum, titanium, steel, carbon fiber, fiberglass, polymer, rubber, plastic, composite, and combinations thereof. In one or more embodiments, the fins 103 may be integral, or formed with, the body portions 102 such that, e.g., the fins 103 and the body portion 102 that the fins 103 are attached thereto may be described as "one-piece." In at least one embodiment, the body portions 102 and the fins 103 may be integrally molded to define each of the forward and aft rotatable control units 110, 120.

Each of the forward and aft rotatable control units 110, 120 may include one or more sets of fins 103. For example, each of the forward and aft rotatable control units 110, 120 in the embodiment depicted in FIGS. 3-7 may include one or more control fins 105 and one or more roll fins 107.

The control fins 105 may be designed (e.g., sized, positioned, angled, etc.) so as to be able to be used to generate forces to move the refueling coupling 12 in the direction of those forces by selectively rotating the body portion 102 of the forward and aft rotatable control units 110, 120 with respect to each other. Each of the control fins 103, including control fins 105 and rolls fins 107, may be described as extending from the body portions 102 along a fin plane, and a deflection angle may be defined between the fin plane and the axis 33 of the refueling coupling 12.

Figure 4A:
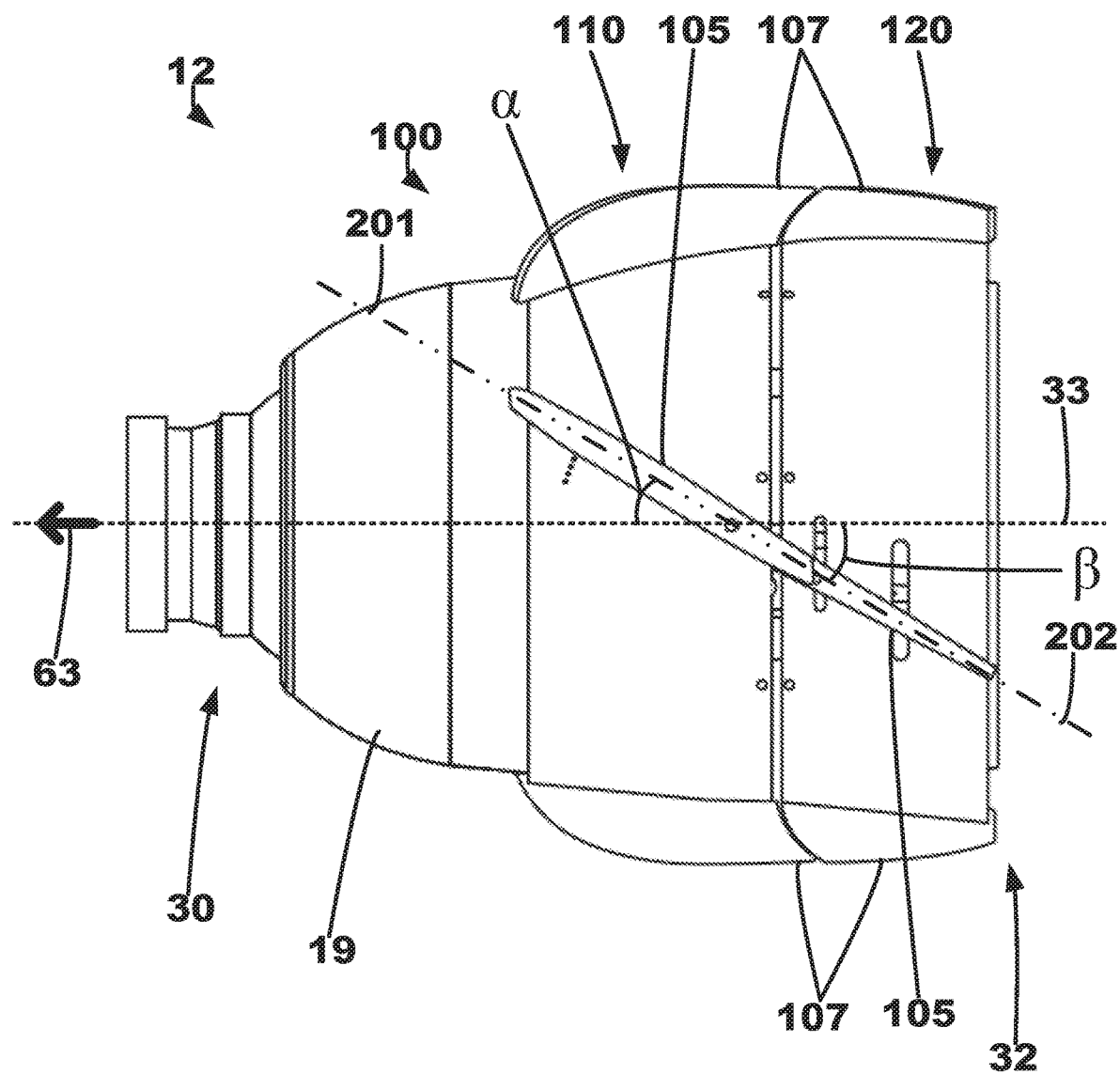
FIG. 4A is a side view of the refueling coupling of FIGS. 2A-2B including a pair of exemplary rotatable control units with the control fins aligned.

For example, as shown in FIG. 4A, a first forward control deflection angle ALPHA may be defined between a fin plane 201 (represented by the dash-dot-dot line) of a first control fin 105 of the forward rotatable control unit 110 and the axis 33 and a first aft control deflection angle BETA may be defined between a fin plane 202 (represented by the dash-dot-dash line) of the first control fin 105 of the aft rotatable control unit 120 and the axis 33.

Figure 4B:
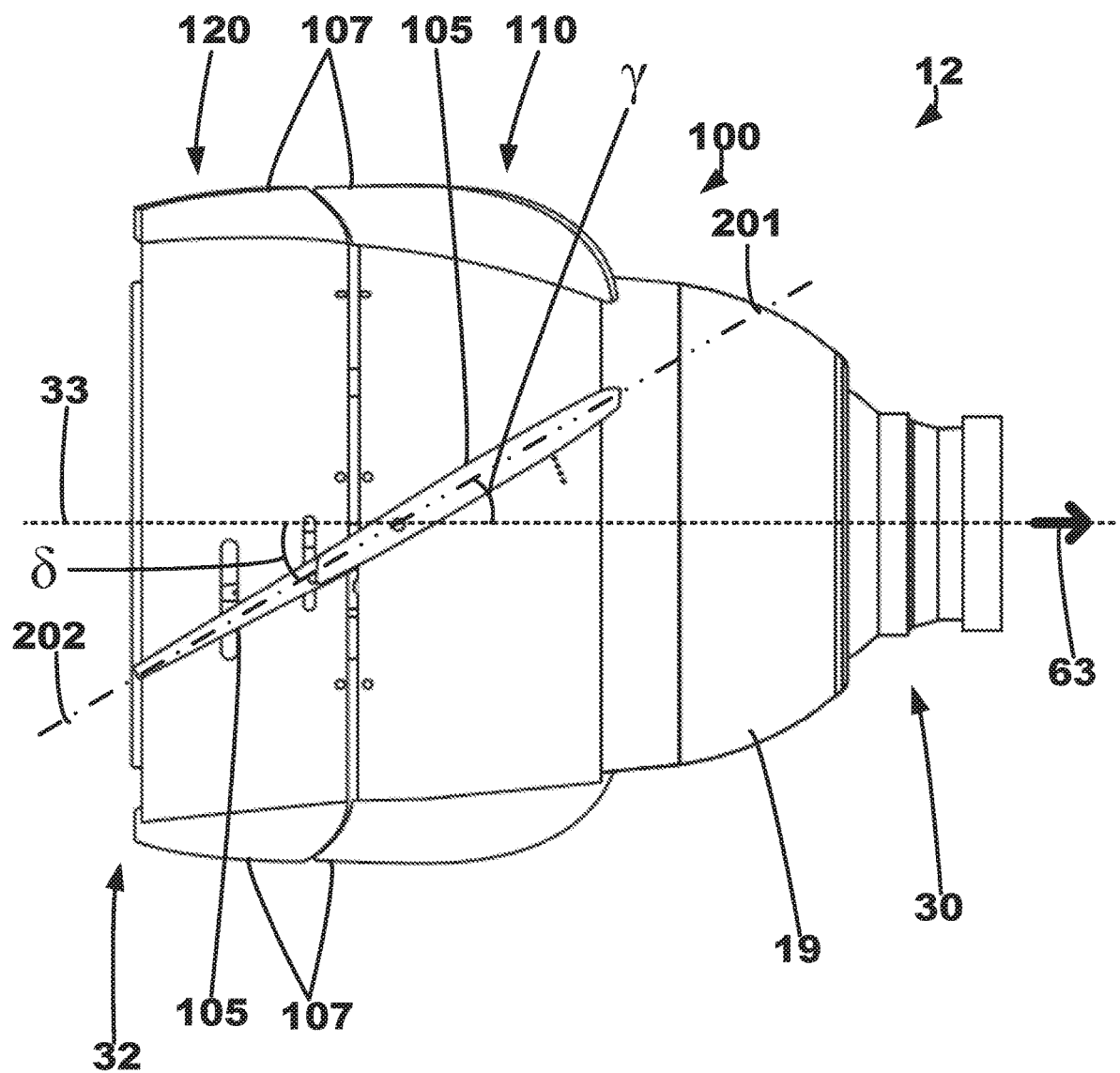
FIG. 4B is the opposite side view of the refueling coupling and exemplary rotatable control units of FIG. 4A.

The control fins 105 of the opposing side of the system 100 as shown in FIG. 4B may be the "mirror image" as the control fins 105 on the side of the system as shown in FIG. 4A. For example, a second forward control deflection angle GAMMA may be defined between a fin plane 201 of a second control fin 105 of the forward rotatable control unit 110 and a second aft control deflection angle DELTA may be defined between a fin plane 202 of the second control fin 105 of the aft rotatable control unit 120 and the axis 33.

In one or more embodiments such as shown, each of forward control deflection angles ALPHA and GAMMA may be the same size, and each of aft control deflection angles BETA and DELTA may be the same size. In other embodiments, the forward control deflection angles may not be the same size, and the aft control deflection angles may not be the same size. For example, the first control deflection angles may be less than or greater than the second control deflection angles.

Further, in some embodiments, the forward and aft control angles may be the same or different. For example, as shown, the first and second forward control deflection angles ALPHA and GAMMA the first and second aft control deflection angles BETA and DELTA. In other embodiments, the first and second forward control deflection angles may be less than or greater than the first and second aft control deflection angles.

In the embodiment depicted, the first and second forward control deflection and the first and second aft control deflection angles are about 35 degrees. The control deflection angles may be between about 5 degrees and about 55 degrees. For example, the control deflection angles may be greater than or equal to about 5 degrees, greater than or equal to about 15 degrees, greater than or equal to about 20 degrees, greater than or equal to about 30 degrees, greater than or equal to about 40 degrees, greater than or equal to about 50 degrees, etc. For example, the control deflection angles may be less than or equal to about 55 degrees, less than or equal to about 45 degrees, less than or equal to about 35 degrees, less than or equal to about 25 degrees, less than or equal to about 17 degrees, less than or equal to about 12 degrees, etc.

Further, as shown in the rear view of FIG. 4C, each of the first forward and first aft control fins 105 may be configured to generate a rotational force about the axis 33 in a first rotational direction 148 as the refueling coupling moves along the direction of travel 63. In other words, the first forward and first aft control fins 105 may be configured to spin, or rotate, the body portions 102, that the control fins 105 are respectively coupled thereto, in the same rotational direction 148 about the axis 33.

Conversely, as shown in this embodiment, each of the second forward and second aft control fins 105 may be configured to generate a rotational force about the axis 33 in a second rotational direction 149 that is opposite the first rotational direction 148 as the refueling coupling moves along the direction of travel 63. In other words, the second forward and second aft control fins 105 may be configured to spin, or rotate, the body portions 102, that the control fins 105 are respectively coupled thereto, in the same rotational direction 149 about the axis 33, which is opposite that of the first forward and first aft control fins 105.

Additionally, each of the opposite rotational forces of the first and second control fins 105 may have about the same, or the same, magnitude. Thus, for example, the net rotational torque generated by the first and second control fins 105 of each of the forward rotatable control unit 110 and the aft rotatable control unit 102 may effectively "cancel out" each other's rotational force.

The control fins 105 may be used by the system 100 to generate various forces at least partially perpendicular to the axis 33 and/or the direction of travel such that, e.g., the system 100 may move the refueling coupling 12 for stabilization, etc. More specifically, the forward and aft rotatable control units 110, 120 may be positionable, or movable, with respect to each other to position the first and second forward control fins 105 and the first and second aft control fins 105 with respect to each other to generate the desired forces at least partially perpendicular to the axis 33 and/or the direction of travel 63. For example, as shown in FIGS. 4A-4C, the forward and aft rotatable control units 110, 120 may be positionable with respect to each other to align the first forward and the first aft control fins 105 with each other and to align the second forward and the second aft control fins 105 with each other to selectively generate a first force 256 at least partially perpendicular to the axis 33. It may be described that the forward and aft control fins 105 are aligned when the fin planes of the forward and aft control fins lie within the same or similar plane. The configuration of the forward and aft rotatable control units 110, 120 shown in FIGS. 4A-4C may generate the maximum amount of force 256 at least partially perpendicular to the axis 33.

Figure 5A:
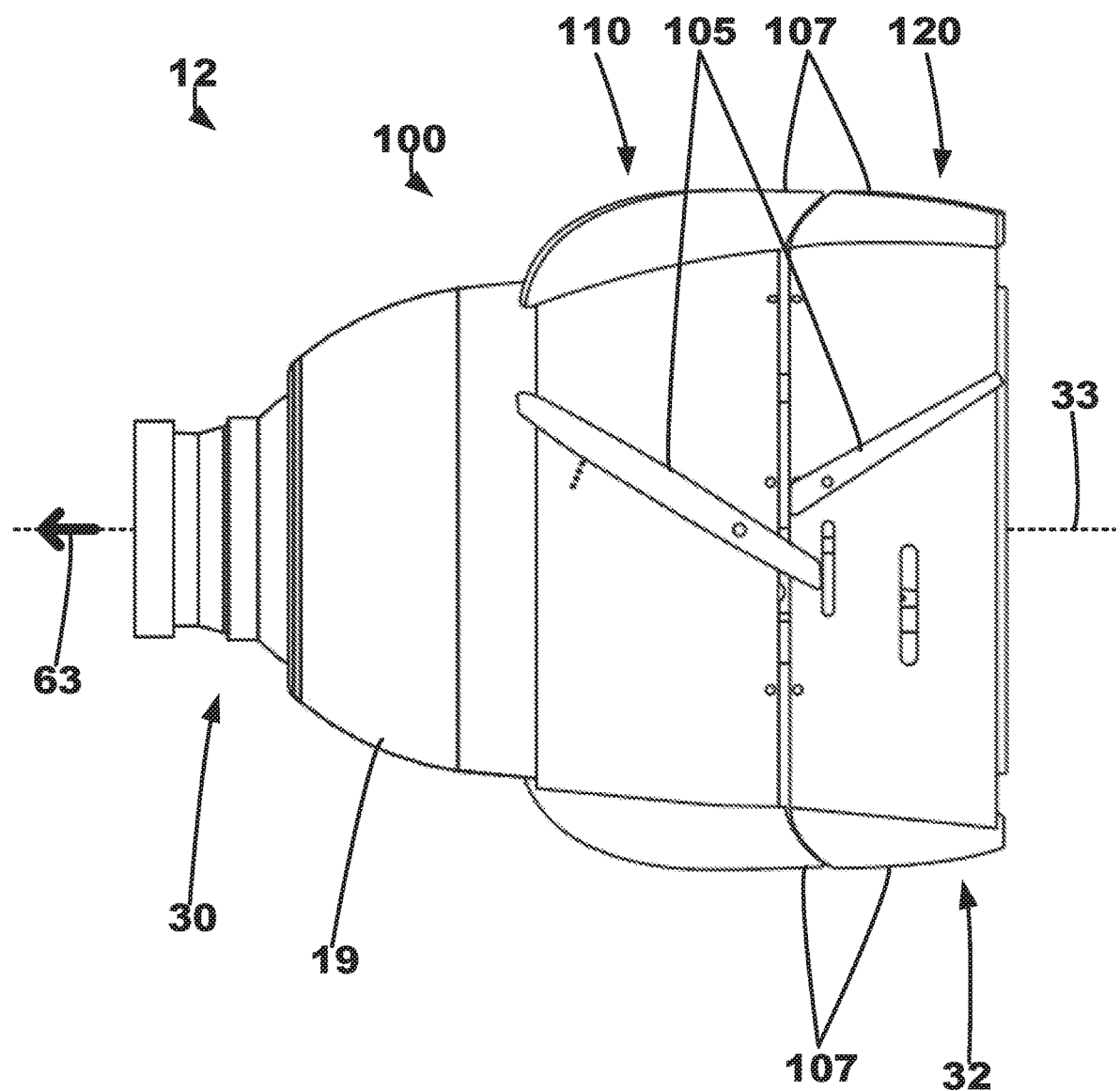
FIG. 5A is a side view of the refueling coupling of FIGS. 2A-2B including a pair of exemplary rotatable control units with the control fins unaligned in a first configuration.
Figure 5B:
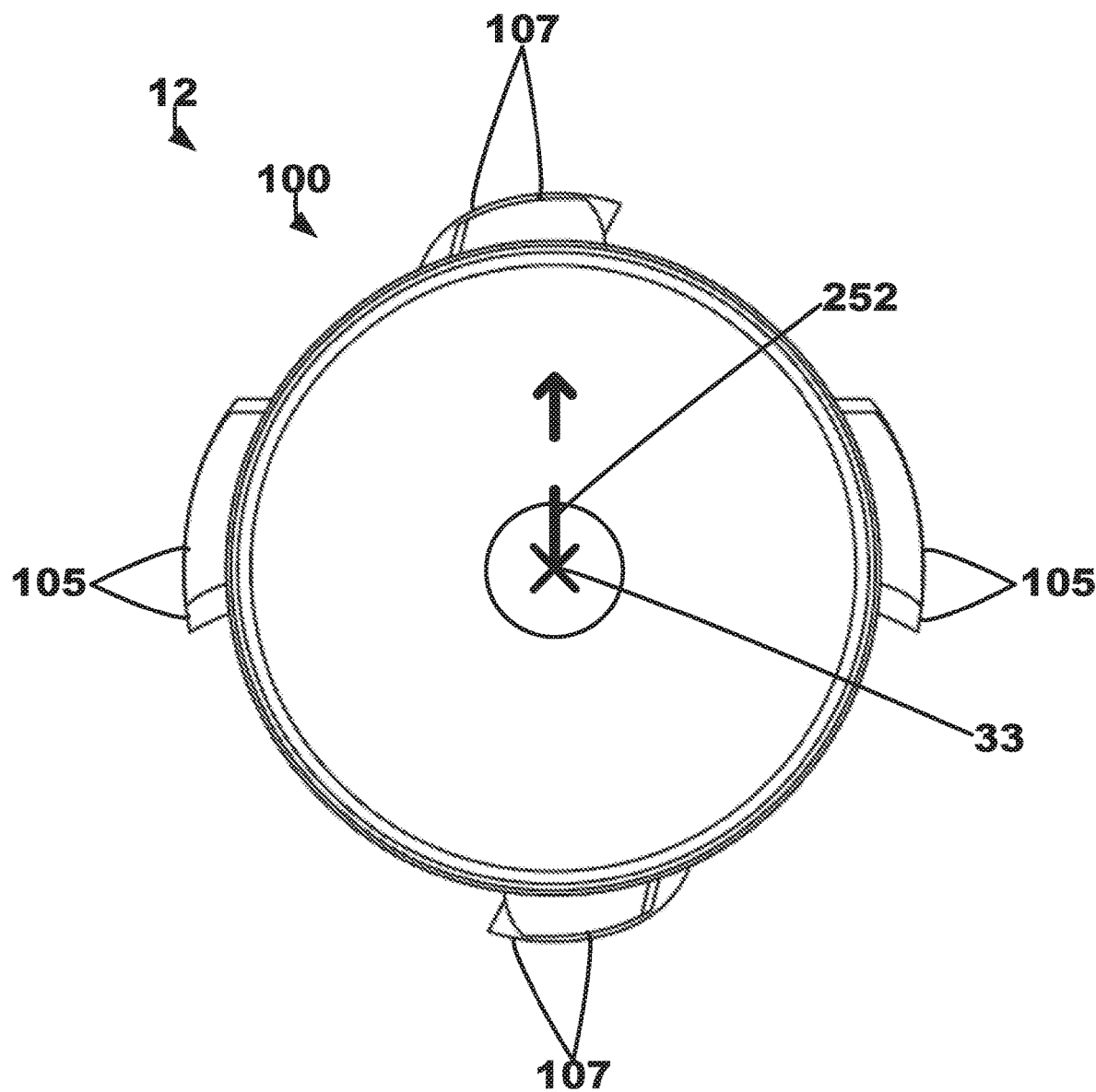
FIG. 5B is a rear view of the refueling coupling and exemplary rotatable control units of FIG. 5A.
Figure 6A:
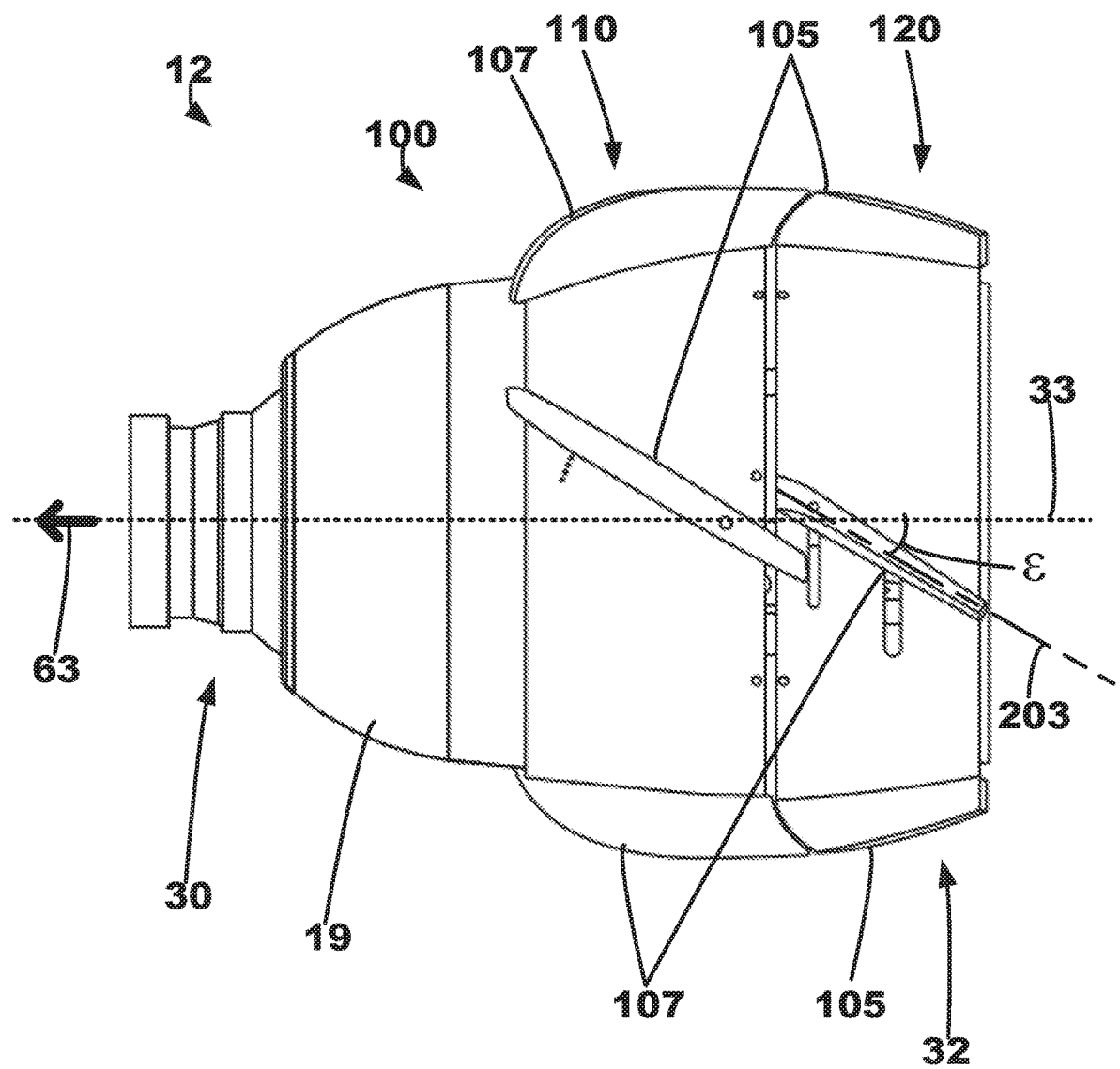
FIG. 6A is a side view of the refueling coupling of FIGS. 2A-2B including a pair of exemplary rotatable control units with the control fins unaligned in a second configuration.
Figure 6B:
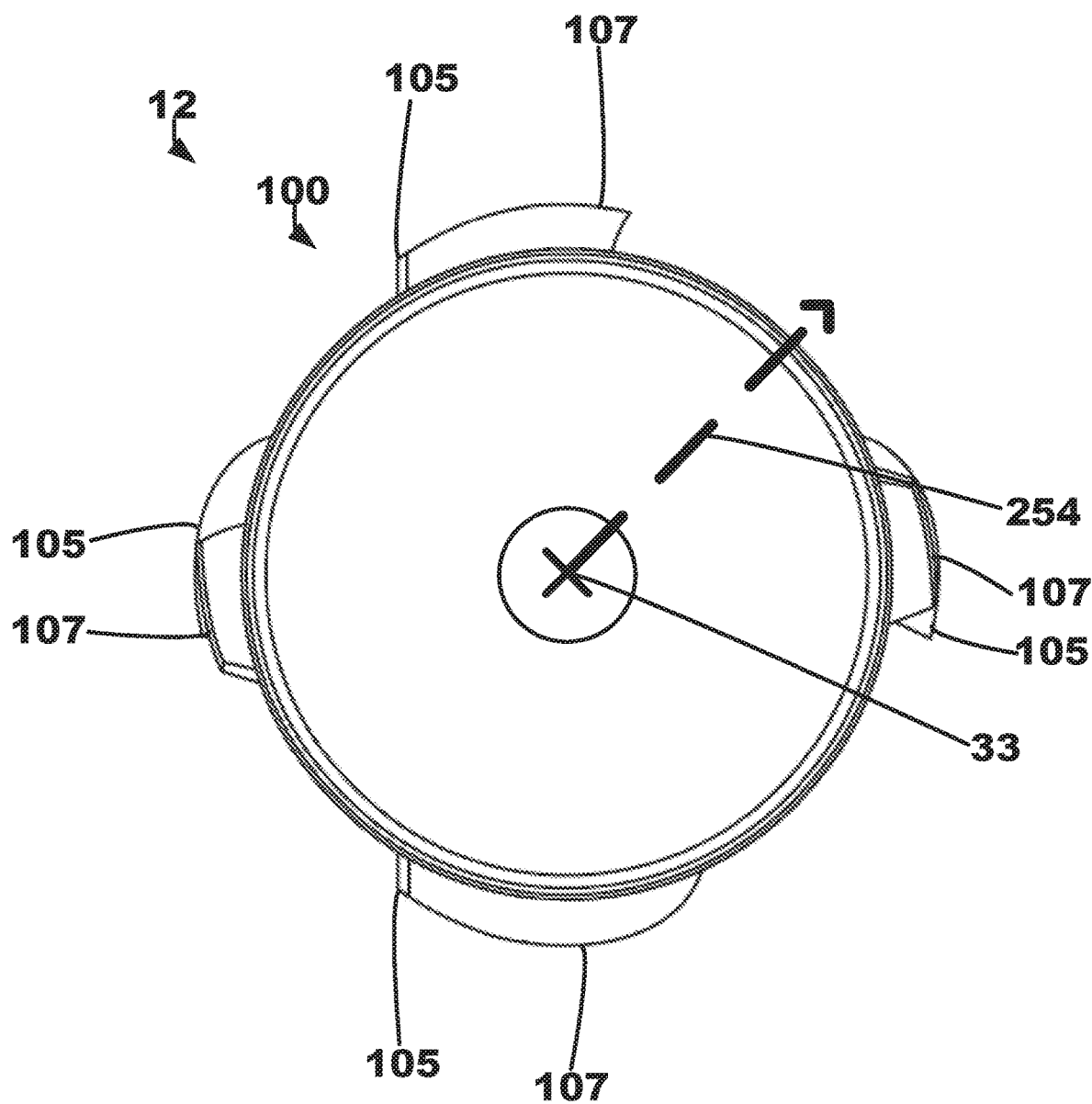
FIG. 6B is a rear view of the refueling coupling and exemplary rotatable control units of FIG. 6A.
Figure 8:
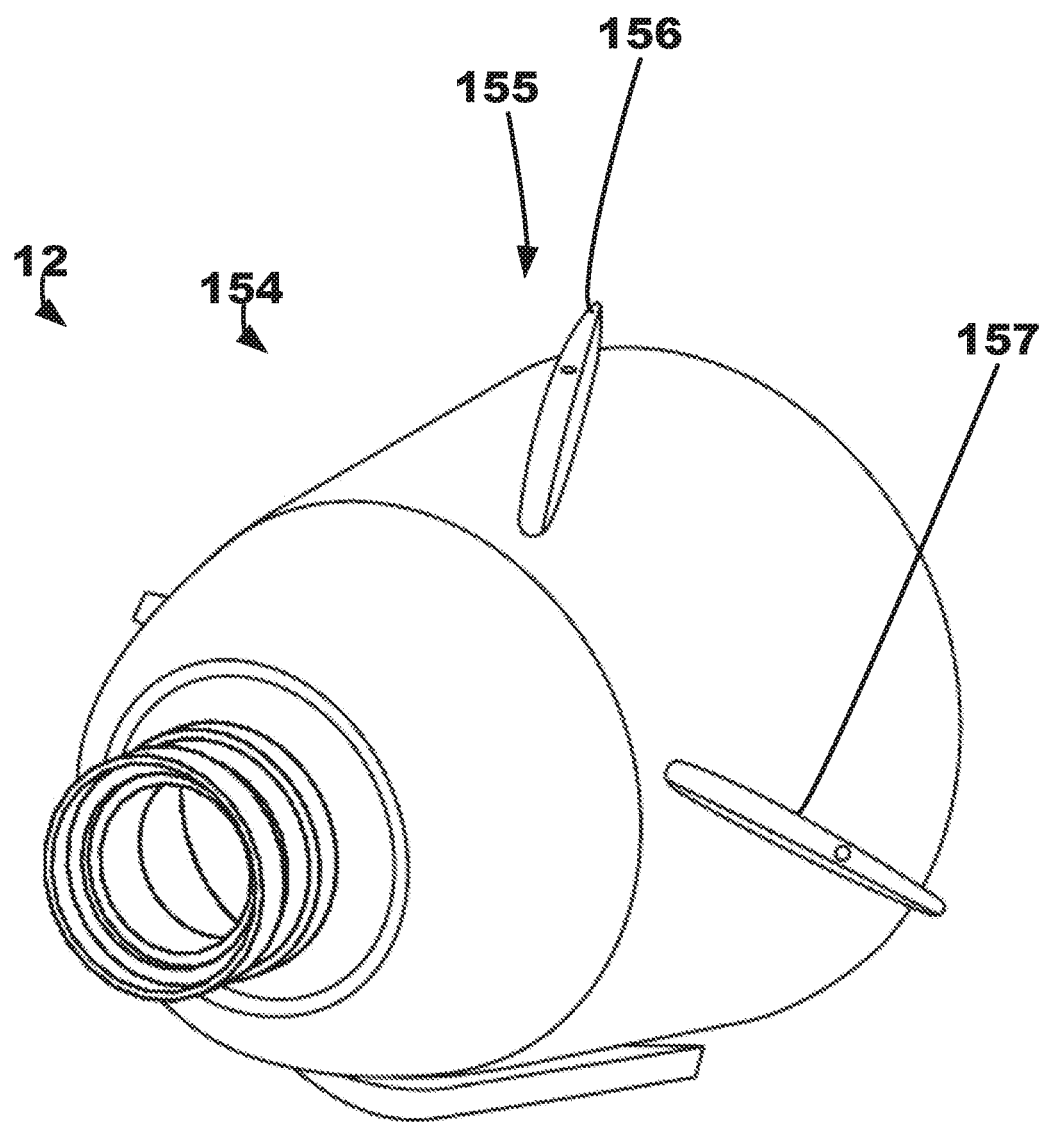
FIG. 8 is a perspective view of the refueling coupling of FIGS. 2A-2B including an exemplary rotatable control unit.

Further, for example, as shown in FIGS. 5A-5B and FIGS. 6A-6B, the forward and aft rotatable control units 110, 120 may be positionable with respect to each other to position the first forward and the first aft control fins 105 to be unaligned and the second forward and the second aft control fins 105 to be unaligned. In FIGS. 5A-5B, the first forward and the first aft control fins 105 and the second forward and the second aft control fins 105 are unaligned, for example, at about 180 degrees from their previous positions shown in FIGS. 4A-4C, to selectively generate a second force 252 at least partially perpendicular to the axis 33. In other words, since the first forward and second forward control fins 105 were described as being aligned with the first aft and second aft control fins 105 in FIGS. 4A-4C, the positions of the control fins 105 in FIGS. 5A-5B may be described as the first forward and second forward control fins 105 being unaligned with the first aft and second aft control fins 105 by about 180 degrees. In FIGS. 6A-6B, the first forward and the first aft control fins 105 and the second forward and the second aft control fins 105 are unaligned, for example, at about 90 degrees from their previous positions shown in FIGS. 4A-4C, to selectively generate a third force 254 at least partially perpendicular to the axis. In other words, since the first forward and second forward control fins 105 were described as being aligned with the first aft and second aft control fins 105 in FIGS. 4A-4C, the positions of the control fins 105 in FIGS. 6A-6B may be described as the first forward and second forward control fins 105 being unaligned with the first aft and second aft control fins 105 by about 90 degrees. In these examples, the first force 256 may be greater than the second or third forces 252, 254. And the third force 254 may be greater than the second force 252 (e.g., as indicated by the length of the arrows representative of the forces 256, 252, 254).

As such, the forward and aft rotatable control units 110, 120 may be positionable with respect to each other and/or and with respect to the refueling coupling 12 to selectively generate the direction and magnitude of a force at least partially perpendicular to the axis 33 to move the refueling coupling 12 in a direction at least partially perpendicular to the axis 33. To position the forward and aft rotatable control units 110, 120 with respect to each other and/or with respect to the refueling coupling 12, the exemplary system 100 may utilize the one or more electric motors 140 described herein to rotate and position the forward and aft rotatable control units 110, 120 as well as control the rate of rotation of the each of the forward and aft rotatable control units 110, 120. The exemplary system 100 may include, or use, controller 412 as further described herein with respect to FIG. 9.

As previously noted, each of the forward and aft rotatable control units 110, 120 may include roll fins 107 as well as control fins 105. Each of the roll fins 107 of a particular rotatable control unit 110, 120 may be configured to generate rotational force about the axis 33 in a selected direction. In other words, all of the roll fins 107 of one of the rotatable control units 110, 120 may be configured to generate a rotational force in the same direction. In the embodiment depicted in FIGS. 3-7, the roll fins 107 of the forward rotatable control unit 110 may be configured to generate a rotational force in the second direction 149 about the axis 33, and the roll fins 107 of the aft rotatable control unit 120 may be configured to generate a rotational force in the first direction 148 about the axis 33 that is opposite the second direction 149.

As shown in this embodiment, each of the rotatable control units 110, 120 includes two roll fins. In other embodiments, each of the rotatable control units 110, 120 may include a single roll fin or more than two rolls fins. For example, each of the rotatable control units 110, 120 may include greater than or equal three roll fins, greater than or equal five roll fins, greater than or equal seven roll fins, greater than or equal ten roll fins, greater than or equal fifteen roll fins, etc. and/or less than or equal twenty-five roll fins, less than or equal twenty roll fins, less than or equal twelve roll fins, less than or equal eight roll fins, less than or equal six roll fins, less than or equal four roll fins, etc.

Further, similar to the control fins 105, the roll fins 107 may define roll deflection angles between the fin planes defined by the roll fins 107 and the axis 33. More specifically, a forward roll deflection angle may be defined between a fin plane of a roll fin 107 of the forward rotatable control unit 110 and the axis 33 and an aft roll deflection angle may be defined between a fin plane of a roll fin 107 of the aft rotatable control unit 120 and the axis 33. For example, an aft roll fin 107 defines a roll deflection angle EPSILON between a roll fin plane 203 and the axis 33 as labeled in FIG. 6A. In one or more embodiments, the forward roll deflection angle may be the same as the aft roll deflection angle. In one or more embodiments, the forward roll deflection angles may be greater than or less than the aft roll deflection angles.

In the embodiment depicted, the forward and aft roll deflection angles are about 35 degrees. The roll deflection angles may be between about 5 degrees and about 55 degrees. For example, the roll deflection angles may be greater than or equal to about 5 degrees, greater than or equal to about 15 degrees, greater than or equal to about 20 degrees, greater than or equal to about 30 degrees, greater than or equal to about 40 degrees, greater than or equal to about 50 degrees, etc. For example, the roll deflection angles may be less than or equal to about 55 degrees, less than or equal to about 45 degrees, less than or equal to about 35 degrees, less than or equal to about 25 degrees, less than or equal to about 17 degrees, less than or equal to about 12 degrees, etc.

Generally, the roll fins 107 may be configured to rotate, or spin, the forward and aft rotatable control units 110, 120 to generate electricity using the one or more electric motors, or electrical generators, 140. The exemplary system 100 may include one or more electricity storage units 141 that are operably coupled to the one or more electric motors 140 such that the electricity generated by the one or more electric motors 140 may be stored in the one or more electricity storage units 141. Additionally, the one or more electricity storage units 141 may be used to power, or provide electricity, to run the one or more electric motors 140 as well as any other electrically-driven apparatus of the exemplary system 100 (such as, e.g., one or more controllers or computing apparatus, input apparatus, any other electro-mechanical apparatus as described herein with reference to FIG. 9).

A perspective view of the refueling coupling 12 including a pair of exemplary rotatable control units 110, 120 including a transition fence portion 190 is depicted in FIG. 7. The transition fence portion 190 may include a ring portion 191 coupled to and extending around a portion of the forward region 30 of the refueling coupling 12 and a plurality of transition fence elements 192 extending therefrom. As shown the transition fence elements 192 define a taper from a forward end to an aft end. Although the transition fence portion 190 is described herein with respect to a refueling coupling 12, it is to be understood that the transition fence portion 190, and concepts and portions thereof, may be utilized with other objects moving through a fluid such as, e.g., an aircraft, a spacecraft, a water craft, a rocket, a missile, projectile, etc.

The tanker aircraft 15 of FIG. 1 may include receiving portions such as e.g., a storage tube, configured to receive the refueling coupling 12 when the fuel hose 14 is retracted when the drogue refueling apparatus 10 is not being used to refuel an aircraft. The transition fence portion 190 may be configured to prevent or reduce the risk of damage to the refueling coupling 12 and the exemplary system 100 when being retracted and stowed with a receiving portion of a tanker aircraft 15 such as a storage tube. Further, one or more portions of the transition fence portion 190 such as, e.g., the transition fence elements 192 may be further configured to position, or space, the plurality of fins 103 of the rotatable control units 110, 120 away from the receiving portion to avoid, prevent, or reduce any damage to the fins 103 and/or the remainder of the system 100 and the refueling coupling 12. In other words, the transition fence portion 190 may facilitate entry of the exemplary systems and apparatus into the storage tube and may reduce the impact forces on the exemplary systems and apparatus when contact with the storage tube does occur.

Although the system 100 depicted in FIGS. 3-7 includes two, or a pair, of rotatable control units 110, 120, it is to be understood that exemplary systems may include a single rotatable control unit or more than two rotatable control units. For example, the exemplary system 154 depicted in FIG. 8 includes a single rotatable control unit 155 rotatably coupled to the refueling coupling 12 to control movement of the refueling coupling 12 similar as the system 100 described herein. The single rotatable control unit 155 of the system 154 may include both control fins 157 and roll fins 156. As shown in the embodiment depicted, the single rotatable control unit 155 includes two control fins 157 and two roll fins 156.

The system 100 may further include controller 412 as described herein with reference to FIG. 9 to selectively control the rate of rotation and the position of the forward and aft rotatable control units 110, 120 to selectively move the refueling coupling 12 in a direction at least partially perpendicular to the axis 33. The computing apparatus 412 may include one or more processors and may be configured to receive input from input apparatus 420 and transmit output to electro-mechanical apparatus 422. Further, the computing apparatus 412 may include data storage 414. Data storage 414 may allow for access to processing programs or routines 416 and one or more other types of data 418 (e.g., sensor data, position data, rotational positional encoding data, global positioning system (GPS) data, image data, inertial measurement unit (IMU) data, etc.) that may be employed to perform, or carry out, exemplary methods and/or processes (e.g., generate predicted movements of the refueling coupling, determine the forces needs for stabilization and/or movement of the refueling coupling, determine the rotational rate of the rotatable control units for use in stabilization and/or movement, etc.) for use in controlling movement of the refueling coupling. The computing apparatus 412 may be operatively coupled to the input apparatus 420 and the electro-mechanical apparatus 422 to, e.g., transmit data to and from each of the input apparatus 420 and the electro-mechanical apparatus 422. For example, the computing apparatus 412 may be operatively coupled to each of the input apparatus 420 and the electro-mechanical apparatus 422 using, e.g., analog electrical connections, digital electrical connections, wireless connections, bus-based connections, etc.

Further, various devices and apparatus may be operatively coupled to the computing apparatus 412 to be used with the computing apparatus 412 to perform the functionality, methods, and/or logic described herein. As shown, the system 100 may include input apparatus 420 and electro-mechanical apparatus 422 operatively coupled to the computing apparatus 412 (e.g., such that the computing apparatus 412 may be configured to use information, or data, from the apparatus 420, 422 and provide information, or data, to the apparatus 420, 422). The input apparatus 420 may include any apparatus capable of providing input to the computing apparatus 412 to perform the functionality, methods, and/or logic described herein. For example, the input apparatus 420 may include any apparatus configured to assist in the controlling the movement of the refueling coupling 12. For example, accelerometers, position encoders or sensors, image sensors, global positioning system (GPS) sensors, inertial measurement units (IMU), etc. may also be used to provide input to the computing apparatus 412 regarding the position and/or movement of the refueling coupling 12.

In one or more embodiments, the computing apparatus 412 and the input apparatus 420 may be located within the refueling coupling 12 as part of the system 100. Further, in one or more embodiments, the computing apparatus 412 and the input apparatus 420 may be may be located elsewhere such as the tanker aircraft 15 and operatively coupled to the remainder of the system 100 (e.g., wireless, wired along the fuel hose, etc.).

The electro-mechanical apparatus 422 may include any apparatus capable of controlling the movement of the refueling coupling 12 such as the forward and aft rotatable control units 110, 120. More specifically, the electro-mechanical apparatus 422 may include the one or more electric motors 140 configured to rotate, or control the rotation, of the forward and aft rotatable control units 110, 120.

The processing programs or routines 416 may include programs or routines for data recording, computational mathematics, matrix mathematics, standardization algorithms, comparison algorithms, or any other processing required to implement one or more exemplary methods and/or processes described herein. Data 418 may include, for example, variables, results from one or more processing programs or routines employed according to the disclosure herein, or any other data that may be necessary for carrying out the one and/or more processes or methods described herein.

In one or more embodiments, the system 100 may be implemented using one or more computer programs executed on programmable computers, such as computers that include, for example, processing capabilities, data storage (e.g., volatile or non-volatile memory and/or storage elements), input devices, and output devices. Program code and/or logic described herein may be applied to input data to perform functionality described herein and generate desired output information. The output information may be applied as input to one or more other devices and/or methods as described herein or as would be applied in a known fashion.

The program used to implement the methods and/or processes described herein may be provided using any programmable language, or code, e.g., a high level procedural and/or object orientated programming language or code that is suitable for communicating with a computer system. Any such programs may, for example, be stored on any suitable device, e.g., a storage media, that is readable by a general or special purpose program running on a computer system (e.g., including processing apparatus) for configuring and operating the computer system when the suitable device is read for performing the procedures described herein. In other words, at least in one embodiment, the system 100 may be implemented using a computer readable storage medium, configured with a computer program, where the storage medium so configured causes the computer to operate in a specific and predefined manner to perform functions described herein. Further, in at least one embodiment, the system 100 may be described as being implemented by logic (e.g., object code) encoded in one or more non-transitory media that includes code for execution and, when executed by one or more processors, is operable to perform operations such as the methods, processes, and/or functionality described herein.

The computing apparatus 412 may be, for example, any fixed or mobile computer system (e.g., a controller, a microcontroller, a personal computer, mini computer, etc.). The exact configuration of the computing apparatus 412 is not limiting, and essentially any device capable of providing suitable computing capabilities and control capabilities may be used. As described herein, a digital file may be any medium (e.g., volatile or non-volatile memory, a CD-ROM, a punch card, magnetic recordable tape, etc.) containing digital bits (e.g., encoded in binary, trinary, etc.) that may be readable and/or writeable by computing apparatus 412 described herein. Also, as described herein, a file in user-readable format may be any representation of data (e.g., ASCII text, binary numbers, hexadecimal numbers, decimal numbers, graphically, etc.) presentable on any medium (e.g., paper, a display, etc.) readable and/or understandable by a user.

In view of the above, it will be readily apparent that the functionality as described in one or more embodiments according to the present disclosure may be implemented in any manner as would be known to one skilled in the art. As such, the computer language, the computer system, or any other software/hardware which is to be used to implement the processes described herein shall not be limiting on the scope of the systems, processes or programs (e.g., the functionality provided by such systems, processes or programs) described herein.

The methods and/or logic described in this disclosure, including those attributed to the systems, or various constituent components, may be implemented, at least in part, in hardware, software, firmware, or any combination thereof. For example, various aspects of the techniques may be implemented within one or more processors, including one or more microprocessors, DSPs, ASICs, FPGAs, or any other equivalent integrated or discrete logic circuitry, as well as any combinations of such components, or other devices. The term "processor" or "processing circuitry" may generally refer to any of the foregoing logic circuitry, alone or in combination with other logic circuitry, or any other equivalent circuitry.

Such hardware, software, and/or firmware may be implemented within the same device or within separate devices to support the various operations and functions described in this disclosure. In addition, any of the described components may be implemented together or separately as discrete but interoperable logic devices. Depiction of different features, e.g., using block diagrams, etc., is intended to highlight different functional aspects and does not necessarily imply that such features must be realized by separate hardware or software components. Rather, functionality may be performed by separate hardware or software components, or integrated within common or separate hardware or software components.

When implemented in software, the functionality ascribed to the systems, devices and methods described in this disclosure may be embodied as instructions and/or logic on a computer-readable medium such as RAM, ROM, NVRAM, EEPROM, FLASH memory, magnetic data storage media, optical data storage media, or the like. The instructions and/or logic may be executed by one or more processors to support one or more aspects of the functionality described in this disclosure.

All patents, patent documents, and references cited herein are incorporated in their entirety as if each were incorporated separately. This disclosure has been provided with reference to illustrative embodiments and is not meant to be construed in a limiting sense. As described previously, one skilled in the art will recognize that other various illustrative applications may use the techniques as described herein to take advantage of the beneficial characteristics of the systems, apparatus, and methods described herein. Various modifications of the illustrative embodiments, as well as additional embodiments of the disclosure, will be apparent upon reference to this description.

What is claimed is:

1. A system for controlling movement of an object comprising:
    a forward rotatable control unit to controllably rotate about an axis in a first or second rotational direction to assist in moving the object in a direction at least partially perpendicular to the axis; and
    an aft rotatable control unit to controllably rotate about the axis in the first or second rotational direction to assist in moving the object in a direction at least partially perpendicular to the axis, wherein the aft rotatable control unit is positioned at least partially rearward from the forward rotatable control unit along a direction of travel of the object,
    wherein each of the forward and aft rotatable control units comprises:
        a body portion rotatably couplable to the object; and
        one or more resilient fins fixedly extending from the body portion, wherein the one or more resilient fins are resilient to deflection as the object moves along the direction of travel, and wherein the one or more resilient fins of each of the forward and aft rotatable control units comprises:
a first control fin and a second control fin, wherein the first and second control fins of the forward and aft rotatable control units are positioned with respect to each other by selectively rotating the body portion of the respective forward and aft rotatable control units with respect to each other to selectively generate a force at least partially perpendicular to the axis to move the object in the direction of the force.

2. The system of claim 1, wherein the forward and aft rotatable control units are positionable with respect to each other to selectively generate a magnitude of a force at least partially perpendicular to the axis.

3. The system of claim 1, wherein the forward and aft rotatable control units are positionable with respect to the object to selectively generate a direction of a force at least partially perpendicular to the axis.

4. The system of claim 1, wherein the one or more resilient fins of at least one of the forward control unit and the aft control unit comprises at least one roll fin to generate rotational force about the axis in the first or the second direction.

5. The system of claim 1, wherein the forward and aft rotatable control units controllably rotate about the axis to assist in moving a refueling coupling of a drogue refueling apparatus in a direction at least partially perpendicular to the axis, wherein the body portion of each of the forward and aft rotatable control unit are couplable to the refueling coupling between a drogue of the drogue refueling apparatus and a forward region of the refueling coupling.

6. The system of claim 1, wherein the forward and aft rotatable control units controllably rotate about the axis to assist in moving a refueling coupling of a drogue refueling apparatus in a direction at least partially perpendicular to the axis, wherein the body portion of each of the forward and aft rotatable control units define an outer shroud surface of the refueling coupling of the drogue refueling apparatus.

7. The system of claim 1, wherein the body portion and the one or more resilient fins are integrally molded to define each of the forward and aft rotatable control units.

8. The system of claim 1, further comprising a transition fence portion positioned forward of the forward rotatable control unit to position the one or more resilient fins of the forward and aft rotatable units away from a storage apparatus.

9. The system of claim 1, wherein the system is a retrofit kit to retrofit an object for use in controlling movement of the object.

10. The system of claim 1, wherein the first control fin generates rotational force about the axis in a first rotational direction and the second control fin generates rotational force about the axis in a second rotational direction, where the first rotational direction is opposite the first rotational direction.

11. The system of claim 1, wherein the forward and aft rotatable control units are positionable with respect to each other to align the first control fins and to align the second control fins to selectively generate a first force at least partially perpendicular to the axis, wherein the forward and aft rotatable control units are positionable with respect to each other to position the first control fins to be unaligned and the second control fins to be unaligned to selectively generate a second force at least partially perpendicular to the axis, wherein the first force is greater than the second force.

12. The system of claim 11, wherein the one or more resilient fins fixedly extend from the body portion along one or more fin planes, wherein a first forward control deflection angle is defined between the fin plane of the first control fin of the forward rotatable control unit and the axis and a first aft control deflection angle is defined between the fin plane of the first control fin of the aft rotatable control unit and the axis, wherein the first control fins of the forward and the aft rotatable control units generate a rotational force about the axis in the first rotational direction as the object moves along the direction of travel, and
wherein a second forward control deflection angle is defined between the fin plane of the second control fin of the forward rotatable control unit and the axis and a second aft control deflection angle is defined between the fin plane of the second control fin of the aft rotatable control unit and the axis, wherein the second control fins of the forward and aft rotatable control units generate a rotational force about the axis in the second rotational direction as the object moves along the direction of travel.

13. The system of claim 12, wherein the first and second forward control deflection angles are less than the first and second aft control deflection angles.

14. The system of claim 13, wherein the first forward control deflection angle is greater than the second forward control deflection angle.

15. The system of claim 1, wherein the one or more resilient fins of the forward control unit comprises at least one roll fin to generate rotational force about the axis in the first direction, wherein the one or more resilient fins of the aft control unit comprises at least one roll fin to generate rotational force about the axis in the second direction.

16. The system of claim 15, wherein the one or more resilient fins fixedly extend from the body portion along one or more fin planes, wherein a forward roll deflection angle is defined between the fin plane of the at least one roll fin of the forward rotatable control unit and the axis and an aft roll deflection angle is defined between the fin plane of the at least one roll fin of the aft rotatable control unit and the axis, wherein the forward roll deflection angle is the same as the aft roll deflection angle.

17. The system of claim 1, wherein the system further comprises:
one or more electric motors operably coupled to the forward and aft rotatable control units to rotate the forward and aft rotatable control units about the axis; and
a controller comprising one or more processors and operably coupled to the one or more motors, wherein the controller is configured to selectively control the rate of rotation of the forward and aft rotatable control units to selectively move the object in a direction at least partially perpendicular to the axis.

18. The system of claim 17, wherein the system further comprises one or more electricity storage units, wherein the one or more electric motors are operably coupled to the one or more electricity storage units and to the forward and aft rotatable control units to generate electricity to be stored in the electricity storage units when the forward and aft rotatable control units rotate about the axis.

19. A system for controlling movement of a drogue refueling apparatus comprising:
one or more rotatable control units couplable between forward and rear regions of a refueling coupling of a drogue refueling apparatus and to controllably rotate about an axis to assist in moving the drogue refueling apparatus in a direction at least partially perpendicular to the axis, wherein the one or more rotatable control units comprises:
- a forward rotatable control unit to controllably rotate about the axis in a first or second rotational direction to assist in moving the object in a direction at least partially perpendicular to the axis; and
- an aft rotatable control unit to controllably rotate about the axis in a first or second rotational direction to assist in moving the object in a direction at least partially perpendicular to the axis, wherein the aft rotatable control unit is positioned at least partially rearward from the forward rotatable control unit along a direction of travel of the drogue refueling apparatus,
- wherein each of the one or more rotatable control units comprises:
  - a body portion rotatably couplable to the refueling coupling; and
  - a plurality of resilient fins fixedly extending from the body portion, wherein the plurality of resilient fins are resilient to deflection as the drogue refueling apparatus moves along the direction of travel.

20. The system of claim 19, further comprising a transition fence portion coupled to the forward end region of the refueling coupling of the drogue refueling apparatus to contact at least a portion of a storage tube to position the plurality of resilient fins of the one or more rotatable units away from the storage tube.

21. The system of claim 19, wherein the system is a retrofit kit to retrofit an object for use in controlling movement of the object.

22. A system for controlling movement of an object comprising:
- a forward rotatable control unit to controllably rotate about an axis in both a first and second rotational direction to assist in moving the object in a direction at least partially perpendicular to the axis; and
- an aft rotatable control unit to controllably rotate about the axis in both the first and second rotational direction to assist in moving the object in a direction at least partially perpendicular to the axis, wherein the aft rotatable control unit is positioned at least partially rearward from the forward rotatable control unit along a direction of travel of the object,
- wherein each of the forward and aft rotatable control units comprises:
  - a body portion rotatably couplable to the object; and
  - one or more resilient fins fixedly extending from the body portion, wherein the one or more resilient fins are resilient to deflection as the object moves along the direction of travel.

23. A system for controlling movement of an object comprising:
- a forward rotatable control unit to controllably rotate about an axis in a first or second rotational direction to assist in moving the object in a direction at least partially perpendicular to the axis;
- an aft rotatable control unit to controllably rotate about the axis in the first or second rotational direction to assist in moving the object in a direction at least partially perpendicular to the axis, wherein the aft rotatable control unit is positioned at least partially rearward from the forward rotatable control unit along a direction of travel of the object,
- wherein each of the forward and aft rotatable control units comprises:
  - a body portion rotatably couplable to the object; and
  - one or more resilient fins fixedly extending from the body portion, wherein the one or more resilient fins are resilient to deflection as the object moves along the direction of travel; and
- a transition fence portion positioned forward of the forward rotatable control unit to position the one or more resilient fins of the forward and aft rotatable units away from a storage apparatus.

* * * * *